(12) United States Patent
Iwaizumi

(10) Patent No.: US 10,021,303 B2
(45) Date of Patent: Jul. 10, 2018

(54) ELECTRONIC APPARATUS, RECORDING MEDIUM AND ELECTRONIC APPARATUS SYSTEM

(71) Applicant: KYOCERA CORPORATION, Kyoto (JP)

(72) Inventor: Tomoki Iwaizumi, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/377,876

(22) Filed: Dec. 13, 2016

(65) Prior Publication Data
US 2017/0187957 A1 Jun. 29, 2017

(30) Foreign Application Priority Data
Dec. 24, 2015 (JP) .................................. 2015-251376

(51) Int. Cl.
*H04N 7/14* (2006.01)
*H04N 5/232* (2006.01)
*H04N 5/247* (2006.01)

(52) U.S. Cl.
CPC ......... *H04N 5/23245* (2013.01); *H04N 5/247* (2013.01); *H04N 7/142* (2013.01); *H04N 2007/145* (2013.01)

(58) Field of Classification Search
CPC combination set(s) only.
See application file for complete search history.

(56) References Cited

U.S. PATENT DOCUMENTS

| 7,145,593 B2 | 12/2006 | Yamaguchi et al. | |
|---|---|---|---|
| 2007/0292118 A1* | 12/2007 | Traff | G03B 17/08 396/25 |
| 2011/0228074 A1* | 9/2011 | Parulski | G03B 15/05 348/81 |
| 2011/0249076 A1* | 10/2011 | Zhou | H04N 7/147 348/14.02 |
| 2011/0292202 A1* | 12/2011 | Tanaka | G01S 19/49 348/81 |
| 2014/0044154 A1* | 2/2014 | Wolfe | H04B 13/02 375/218 |
| 2014/0071264 A1* | 3/2014 | Seo | H04N 9/735 348/81 |

FOREIGN PATENT DOCUMENTS

JP 2004-140434 5/2004

* cited by examiner

*Primary Examiner* — Joseph J Nguyen
(74) *Attorney, Agent, or Firm* — Duane Morris LLP

(57) ABSTRACT

An electronic apparatus, a non-transitory computer readable recording medium, and an electronic apparatus system are disclosed. In one embodiment, an electronic apparatus comprises a display screen, a back camera, a submergence sensor, and at least one processor. The back camera is located in a back surface opposite to a front surface on which the display screen is located. The submergence sensor is configured to measure a physical quantity that varies when the electronic apparatus is submerged in water. The at least one processor is configured to detect, based on the physical quantity measured by the submergence sensor, a submergence state in which the back camera is located underwater. When detecting the submergence state, the at least one processor causes the back camera to start capturing a video.

12 Claims, 30 Drawing Sheets

F I G. 2 4
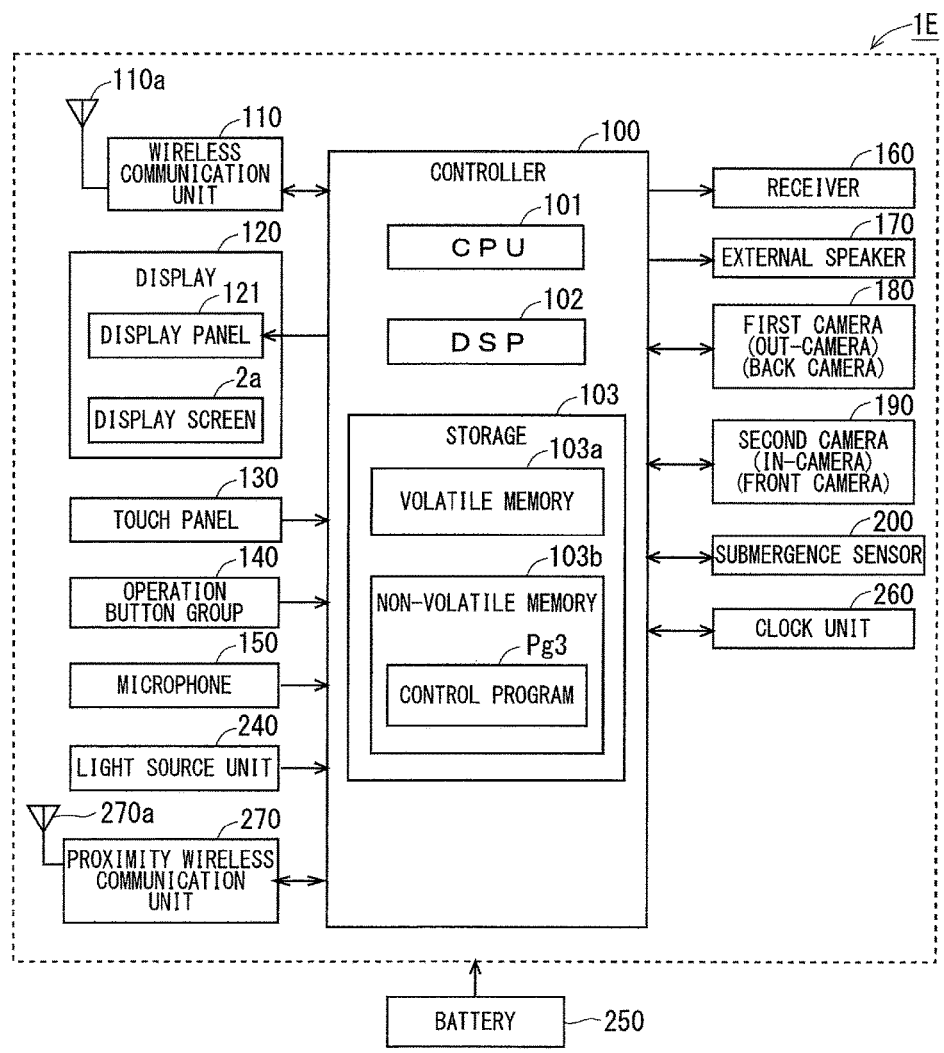

F I G. 4 5
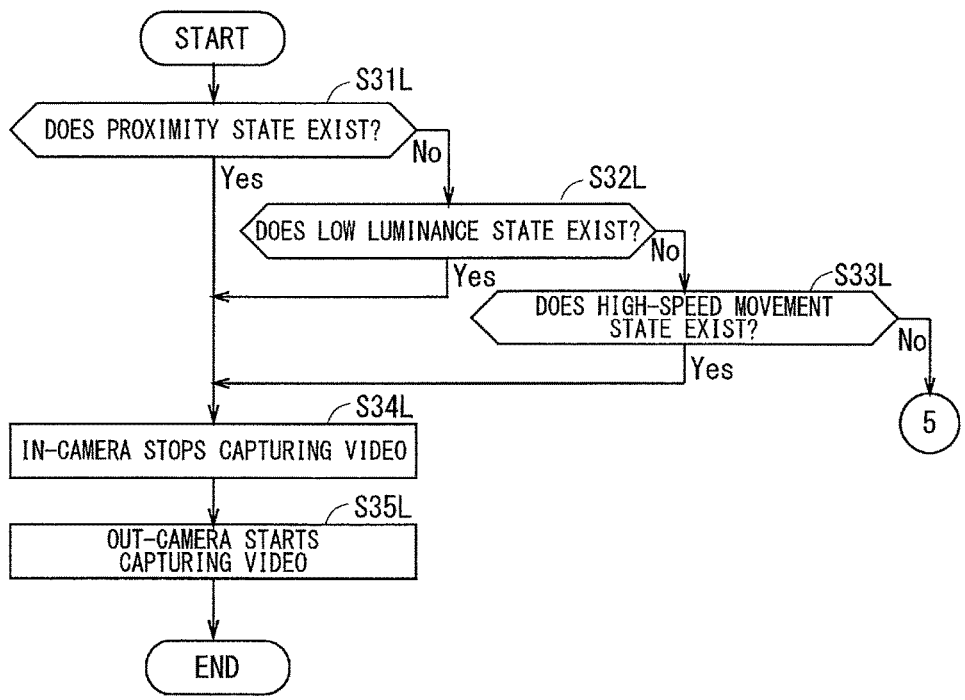

ELECTRONIC APPARATUS, RECORDING MEDIUM AND ELECTRONIC APPARATUS SYSTEM

CROSS-REFERENCE TO RELATED APPLICATION

The present application claims priority under 35 U.S.C. § 119 to Japanese Patent Application No. 2015-251376, filed on Dec. 24, 2015, entitled "ELECTRONIC APPARATUS, METHOD FOR CONTROLLING ELECTRONIC APPARATUS, CONTROL UNIT OF ELECTRONIC APPARATUS, CONTROL PROGRAM, AND ELECTRONIC APPARATUS SYSTEM". The content of which is incorporated by reference herein in its entirety.

FIELD

Embodiments of the present disclosure relate generally to electronic apparatuses.

BACKGROUND

Various techniques concerning electronic apparatuses including cameras have been proposed.

SUMMARY

An electronic apparatus, a non-transitory computer readable recording medium, and an electronic apparatus system are disclosed. In one embodiment, an electronic apparatus comprises a display screen, a back camera, a submergence sensor, and at least one processor. The back camera is located in a back surface opposite to a front surface on which the display screen is located. The submergence sensor is configured to measure a physical quantity that varies when the electronic apparatus is submerged in water. The at least one processor is configured to detect, based on the physical quantity measured by the submergence sensor, a submergence state in which the back camera is located underwater. When detecting the submergence state, the at least one processor causes the back camera to start capturing a video.

In another embodiment, an electronic apparatus comprises an apparatus case, a submergence sensor, and at least one processor. The submergence sensor is configured to measure a physical quantity that varies when the electronic apparatus is submerged in water. The at least one processor is configured to cause a camera unit of an external device to start capturing a video when detecting, based on the physical quantity measured by the submergence sensor, a submergence state in which the apparatus case is located underwater and recognizing a connection state in which the external device is communicably connected to the electronic apparatus.

In another embodiment, a non-transitory computer readable recording medium stores a control program for controlling an electronic apparatus. The control program causes the electronic apparatus to measure a physical quantity that varies when the electronic apparatus is submerged in water and to detect a submergence state in which a back camera is located underwater. When the submergence state is detected, the electronic apparatus causes the back camera to start capturing a video.

BRIEF DESCRIPTION OF THE DRAWINGS

FIG. 24 illustrates an example of the electrical configuration of the electronic apparatus.

FIG. 45 illustrates a flowchart showing an example of a series of control actions.

DETAILED DESCRIPTION

Figure 1:
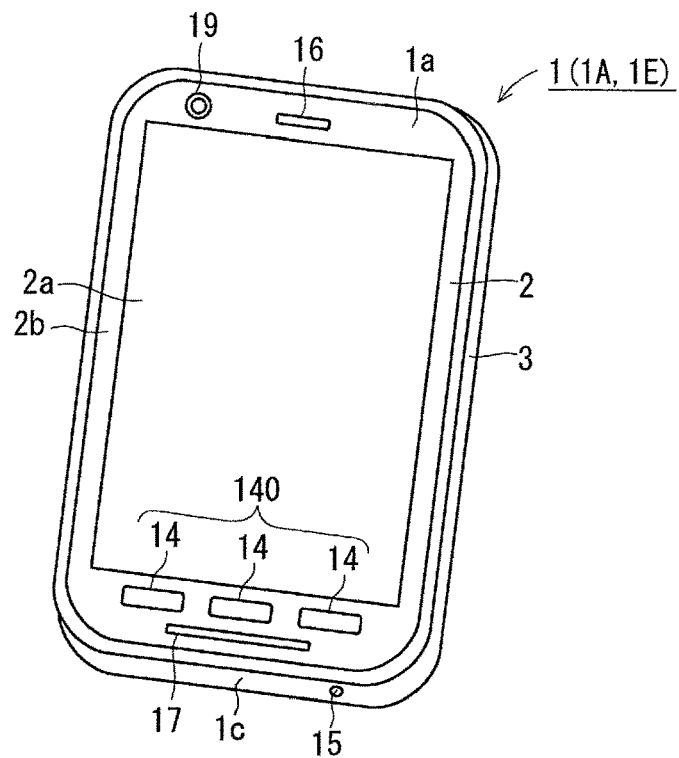
FIG. 1 illustrates a schematic perspective view of an example of an external appearance of an electronic apparatus.

One embodiment of the present disclosure and various modifications thereof will be described below with reference to drawings. In the drawings, the constituent components having similar configurations and functions are denoted by the same reference signs and the description common to these constituent components will not be repeated. Each drawing is merely a schematic illustration, and thus, the size of the individual structure and the positional relation among various structures may be changed as appropriate.

1. One Embodiment 1-1. External Appearance of Electronic Apparatus

Figure 2:
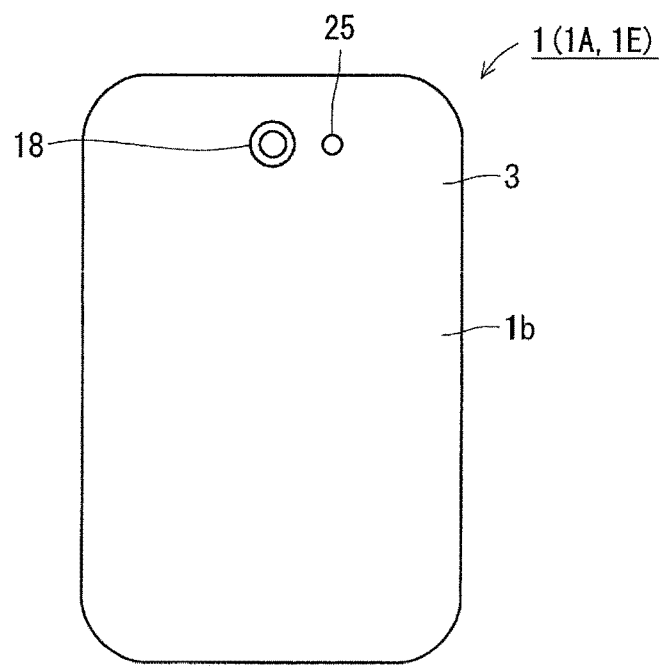
FIG. 2 illustrates a schematic rear view of an example of the external appearance of the electronic apparatus.

FIG. 1 illustrates a schematic perspective view of an example of an external appearance of an electronic apparatus 1. FIG. 2 illustrates a schematic rear view of an example of the external appearance of the electronic apparatus 1. The electronic apparatus 1 is, for example, a "waterproof" mobile phone such as a "waterproof" smartphone. The electronic apparatus 1 can communicate with another communication apparatus via, for example, a base station and a server.

As illustrated in FIGS. 1 and 2, the electronic apparatus 1 includes a cover panel 2 located on a front surface 1a of the electronic apparatus 1 and an apparatus case 3 to which the cover panel 2 is attached. The cover panel 2 and the apparatus case 3 constitute an outer package of the electronic apparatus 1. The electronic apparatus 1 has, for example, an approximately rectangular plate shape in a plan view.

The cover panel 2 includes a display screen 2a on which various types of information, such as characters, signs, and graphics visually output by a display panel 121, which will be described below, are displayed. The display screen 2a is located on the front surface 1a of the electronic apparatus 1. A peripheral part 2b surrounding the display screen 2a in the cover panel 2 is mostly black because of a film or the like laminated thereon. Most of the peripheral part 2b of the cover panel 2 is a non-display area on which various types of information visually output by the display panel 121 are not displayed.

Attached to a rear surface of the display screen 2a is a touch panel 130, which will be described below. The display panel 121 is attached to the surface opposite to the surface on the display screen 2a side of the touch panel 130. This means that the display panel 121 is attached to the rear surface of the display screen 2a with the touch panel 130 therebetween. The user can accordingly provide various instructions to the electronic apparatus 1 by operating the display screen 2a with an operator such as a finger. The positional relationship between the touch panel 130 and the display panel 121 is not limited to the relationship described above. For example, part of the configuration of the touch panel 130 may be embedded in the display panel 121 as long as an operation performed on the display screen 2a by the user with an operator can be detected.

As illustrated in FIG. 1, located in an upper end portion of the cover panel 2 is a second-lens transparent part 19 through which a lens of a second camera 190, which will be described below, can be visually recognized from the outside of the electronic apparatus 1. In the upper end portion of the cover panel 2, a receiver hole 16 is provided. In a lower end portion of the cover panel 2, a speaker hole 17 is provided. Additionally, a microphone hole 15 is provided in a bottom surface 1c of the electronic apparatus 1, or, in a bottom surface (a lower side surface) of the apparatus case 3.

As illustrated in FIG. 2, located in a back surface 1b of the electronic apparatus 1, or, in an upper end portion of a back surface of the apparatus case 3 is a first-lens transparent part 18 through which an imaging lens of a first camera 180, which will be described below, can be visually recognized from the outside of the electronic apparatus 1. Additionally, an illumination transparent part 25 through which a light source unit 240, which will be described below, can be visually recognized from the outside of the electronic apparatus 1 is located in the back surface 1b so as to be adjacent to the first-lens transparent part 18.

The apparatus case 3 houses an operation button group 140 including a plurality of operation buttons 14. Each operation button 14 is a hardware button such as a press button. The operation button may also be referred to as an "operation key" or a "key". Each operation button 14 is exposed from, for example, the lower end portion of the cover panel 2. The user can provide various instructions to the electronic apparatus 1 by operating each operation button 14 with a finger or the like.

The plurality of operation buttons 14 include, for example, a home button, a back button, and a history button. The home button is an operation button for causing a home screen (initial screen) to be displayed on the display screen 2a. The back button is an operation button for switching the display of the display screen 2a to its previous screen. The history button is an operation button for causing a list of applications executed by the electronic apparatus 1 to be displayed on the display screen 2a.

1-2. Electrical Configuration of Electronic Apparatus

Figure 3:
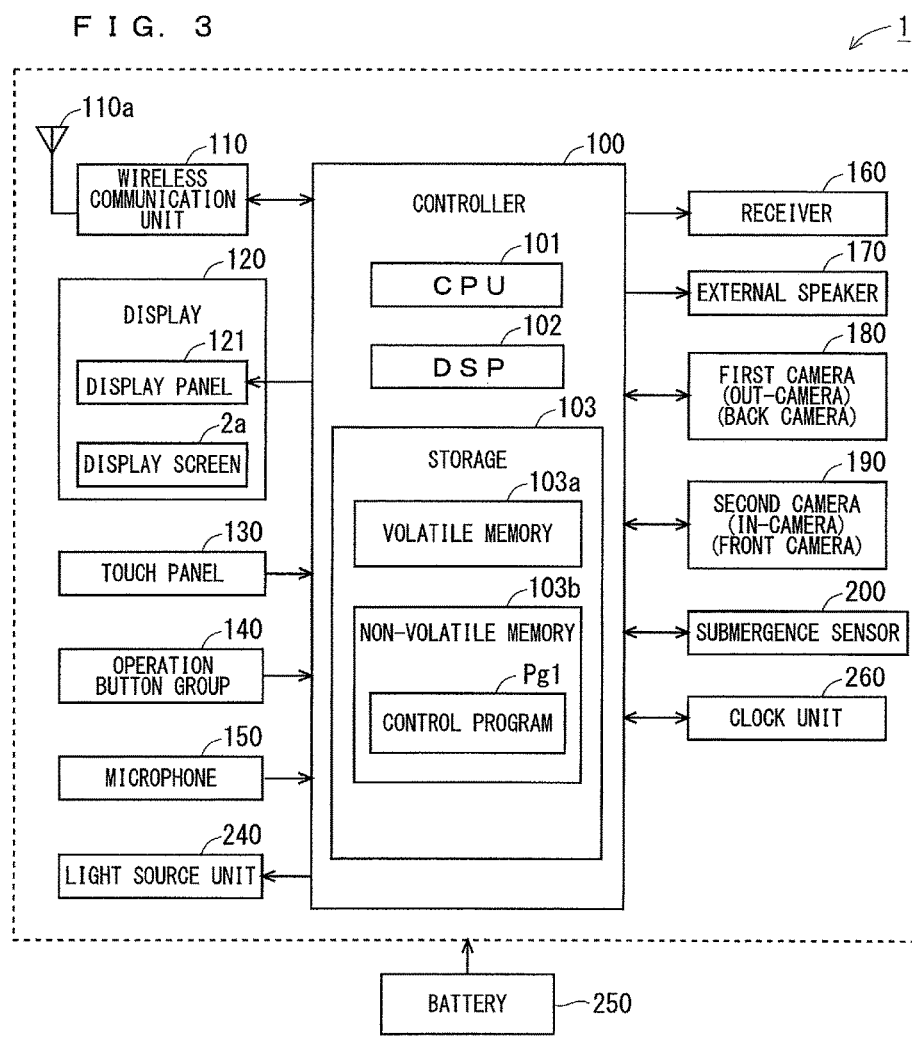
FIG. 3 illustrates an example of an electrical configuration of the electronic apparatus.

FIG. 3 illustrates a block diagram showing an example of an electrical configuration of the electronic apparatus 1. As illustrated in FIG. 3, the electronic apparatus 1 includes a controller 100, a wireless communication unit 110, a display 120, the touch panel 130, the operation button group 140, and a microphone 150. The electronic apparatus 1 further includes a receiver 160, an external speaker 170, the first camera 180, the second camera 190, a submergence sensor 200, the light source unit 240, a battery 250, and a clock unit 260. The apparatus case 3 houses these components of the electronic apparatus 1.

The electronic apparatus 1 includes at least one processor for providing control and processing capability to perform various functions as described in further detail below. In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The controller 100 is a kind of an arithmetic processing unit and includes, for example, electric circuits such as a central processing unit (CPU) 101, a digital signal processor (DSP) 102, and a storage 103. The controller 100 can control other constituent components of the electronic apparatus 1 to perform overall control of the operation of the electronic apparatus 1. The controller 100 may further include co-processors such as a system-on-a-chip (SoC), a micro control unit (MCU), and a field-programmable gate array (FPGA). The controller 100 may use the CPU and the co-processors in cooperation or in a selective manner to perform various types of control.

The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory 103b. The RAM of the storage 103 is, for example, a volatile memory 103a. The storage 103 can store, for example, a main program for controlling the electronic apparatus 1 and a plurality of application programs (also merely referred to as "applications" hereinafter). The CPU 101 and the DSP 102 execute the various programs stored in the storage 103 to achieve various functions of the controller 100. The storage 103 can store, for example, a call application for performing a call by voice (also referred to as a "voice call") and a call by video and voice (also referred to as a "video call") and a camera application for capturing a still image or a video using the first camera 180 or the second camera 190. The applications stored in the storage 103 include, for example, a control program Pg1 for controlling the electronic apparatus 1.

The storage 103 may include a non-transitory computer readable recording medium other than the ROM and the RAM. The storage 103 may include, for example, a compact hard disk drive, a solid state drive (SSD), and the like. All or some of the functions of the controller 100 may be achieved by hardware that needs no software to achieve the functions above.

The wireless communication unit 110 includes an antenna 110a. The wireless communication unit 110 can receive, for example, a signal from a communication apparatus different from the electronic apparatus 1 or a signal from communication equipment such as a web server connected to the Internet through the antenna 110a via a base station. The wireless communication unit 110 can amplify and down-convert the signal received by the antenna 110a and then output a resultant signal to the controller 100. The controller 100 can, for example, demodulate the received signal to acquire information such as a signal (also referred to as a "sound signal") indicating the voice or music contained in the received signal.

The wireless communication unit 110 can also up-convert and amplify a transmission signal generated by the controller 100 to wirelessly transmit the processed transmission signal from the antenna 110a. The transmission signal from the antenna 110a is received, via the base station, by the mobile phone different from the electronic apparatus 1 or the communication equipment such as the web server connected to the Internet.

The display 120 includes the display panel 121 and the display screen 2a. The display panel 121 is, for example, a liquid crystal panel or an organic electroluminescent (EL) panel. The display panel 121 can visually output various types of information such as characters, signs, and graphics under the control of the controller 100. The various types of information, which the display panel 121 visually output, are displayed on the display screen 2a.

The touch panel 130 is, for example, a projected capacitive touch panel. The touch panel 130 can detect an operation performed on the display screen 2a with the operator such as a finger. When the user performs an operation on the display screen 2a with the operator such as the finger, an electrical signal corresponding to the operation is input from the touch panel 130 to the controller 100. The controller 100 can specify, based on the electrical signal from the touch panel 130, the purpose of the operation performed on the display screen 2a and accordingly perform processing appropriate to the purpose. The user can also provide various instructions to the electronic apparatus 1 by operating the display screen 2a with, for example, a pen for capacitive touch panel such as a stylus pen, instead of the operator such as the finger.

When the user operates each operation button 14 of the operation button group 140, the operation button 14 outputs, to the controller 100, an operation signal indicating that the operation button 14 is operated. The controller 100 can accordingly determine, based on the operation signal from the individual operation button 14, whether the operation button 14 has been operated. The controller 100 can perform the processing corresponding to the operation button 14 that has been operated. Each operation button 14 may be a software button displayed on the display screen 2a, instead of a hardware button such as a press button. In this case, the touch panel 130 can detect an operation performed on the software button, so that the controller 100 can perform the processing corresponding to the software button that has been operated.

The microphone 150 can convert the sound from the outside of the electronic apparatus 1 into an electrical sound signal and then output the electrical sound signal to the controller 100. The sound from the outside of the electronic apparatus 1 is, for example, taken inside the electronic apparatus 1 through, for example, the microphone hole 15 in the bottom surface (lower side surface) of the apparatus case 3 and then is received by the microphone 150.

The external speaker 170 is, for example, a dynamic speaker. The external speaker 170 can convert an electrical sound signal from the controller 100 into a sound and then output the sound. The sound output from the external speaker 170 is, for example, output to the outside of the electronic apparatus 1 through the speaker hole 17 in the lower end portion of the cover panel 2. The sound output through the speaker hole 17 is set to a volume such that the sound can be heard in the place apart from the electronic apparatus 1.

The receiver 160 is, for example, a dynamic speaker. The receiver 160 can convert an electrical sound signal from the controller 100 into a sound and then output the sound. The receiver 160 can output, for example, a received sound. The sound output from the receiver 160 is, for example, output to the outside through the receiver hole 16 in the upper end portion of the cover panel 2. The volume of the sound output through the receiver hole 16 is, for example, set to be lower than the volume of the sound output from the external speaker 170 through the speaker hole 17.

The receiver 160 may be replaced with a piezoelectric vibration element. The piezoelectric vibration element can vibrate based on a sound signal from the controller 100. The piezoelectric vibration element is located on, for example, the rear surface of the cover panel 2. The piezoelectric vibration element can cause, through its vibration based on the sound signal, the cover panel 2 to vibrate. When the user brings the cover panel 2 close to his/her ear, the vibration of the cover panel 2 is transmitted to the user as a voice. The receiver hole 16 is not necessary when the receiver 160 is replaced with the piezoelectric vibration element.

The clock unit 260 can obtain the current time and can also obtain the current date. The clock unit 260 includes a real time clock (RTC) and the like. The clock unit 260 can output, to the controller 100, the time information indicating the obtained time and the date information indicating the obtained date.

The light source unit 240 can emit light. The light source unit 240 includes, for example, a xenon lamp, a light-emitting diode (LED), and the like. The light source unit 240 can be visually recognized through the illumination transparent part 25 of the apparatus case 3. The light source unit 240 can illuminate an object located on the apparatus case 3 side of the electronic apparatus 1, or, on the back surface 1b side of the electronic apparatus 1. The light source unit 240 has a flash function or an illumination function of lighting an object to be imaged by the first camera 180.

The battery 250 can output power necessary for the electronic apparatus 1 to perform actions. The battery 250 is, for example, a rechargeable battery such as a lithium-ion secondary battery. The battery 250 can supply power to various electronic components such as the controller 100 and the wireless communication unit 110 of the electronic apparatus 1.

Each of the first camera 180 and the second camera 190 includes a lens, an image sensor, and the like. The first camera 180 and the second camera 190 can individually image an object under the control of the controller 100, generate a still image or a video showing the imaged object, and then output the still image or the video to the controller 100. The controller 100 can store the received still image or the received video in the non-volatile memory 103b or the volatile memory 103a of the storage 103.

The lens of the second camera 190 can be visually recognized from the second-lens transparent part 19 in the cover panel 2. The second camera 190 can thus image an object located on the cover panel 2 side of the electronic apparatus 1, or, on the front surface 1a side of the electronic apparatus 1. The second camera 190 above is also referred to as an "in-camera". The second camera 190 is located in the front surface 1a of the electronic apparatus 1 on which the display screen 2a is located, and may be accordingly referred to as a "front camera".

The lens of the first camera 180 can be visually recognized from the first-lens transparent part 18 in the back surface 1b of the electronic apparatus 1. The first camera 180 can thus image an object located on the back surface 1b side of the electronic apparatus 1. The first camera 180 is also referred to as an "out-camera". The first camera 180 is located in the back surface 1b opposite to the front surface 1a of the electronic apparatus 1 on which the display screen 2a is located, and may be accordingly referred to as a "back-camera".

The submergence sensor 200 and the controller 100 constitute a submergence detector 201 (see FIG. 4) that can detect the state in which the out-camera 180 is located underwater, in other words, the state in which the apparatus case 3 is located underwater. That is to say, the submergence detector 201 can detect the state in which the electronic apparatus 1 is located underwater. This state is also referred to as a "submergence state". The submergence state can arise when the user, who holds the electronic apparatus 1 in the hand, submerges the electronic apparatus 1 in water. The purpose for submerging the electronic apparatus 1 in water is supposedly to capture an image in water by using the out-camera 180 or the in-camera 190 of the electronic apparatus 1.

The submergence sensor 200 can measure a physical quantity that varies when the electronic apparatus 1 is submerged. The submergence sensor 200 outputs, to the controller 100, an electrical signal corresponding to the measured physical quantity. Examples of such a physical quantity that varies when the electronic apparatus 1 is submerged in water include pressure and electrostatic capacity. The submergence sensor 200 may be, for example, a pressure sensor. The pressure sensor can measure, through a pressure-sensitive element, the pressure of a gas or a liquid against a member such as a stainless steel diaphragm or a silicon diaphragm, convert the measured value into an electrical signal, and output the electrical signal to the controller 100. The controller 100 determines the pressure value based on the electrical signal from the pressure sensor. The controller 100 can recognize, based on the determined pressure value, the state in which the apparatus case 3 is located underwater. Specifically, when the determined pressure value exceeds a predetermined threshold, the controller 100 may recognize that the apparatus case 3 is located underwater. For example, the pressure value determined by the controller 100 in the state in which the apparatus case 3 is located underwater is measured in advance, and then, the determined pressure value may be used as the predetermined threshold as required.

Alternatively, the submergence sensor 200 may be, for example, a sensor capable of measuring electrostatic capacity. The sensor capable of measuring electrostatic capacity can measure the electrostatic capacity, convert the measured value of electrostatic capacity into an electrical signal, and output the electrical signal to the controller 100. The controller 100 can determine the value of electrostatic capacity based on the electrical signal from the sensor capable of measuring electrostatic capacity. For example, the controller 100 can recognize, based on the determined value of electrostatic capacity, the state in which the apparatus case 3 is located underwater. The controller 100 may recognize the state in which the apparatus case 3 is located underwater when the determined value of electrostatic capacity exceeds a predetermined threshold. For example, the value of electrostatic capacity determined by the controller 100 in the state in which the apparatus case 3 is located underwater is measured in advance, and then, this measured value of electrostatic capacity may be used as the predetermined threshold as required. The sensor capable of measuring electrostatic capacity is, for example, a touch sensor. The touch panel 130 may be used as the sensor capable of measuring electrostatic capacity. Still alternatively, the submergence detector 201 may include the pressure sensor, the sensor capable of measuring electrostatic capacity, and the controller 100.

1-3. Configuration of Controller

Figure 4:
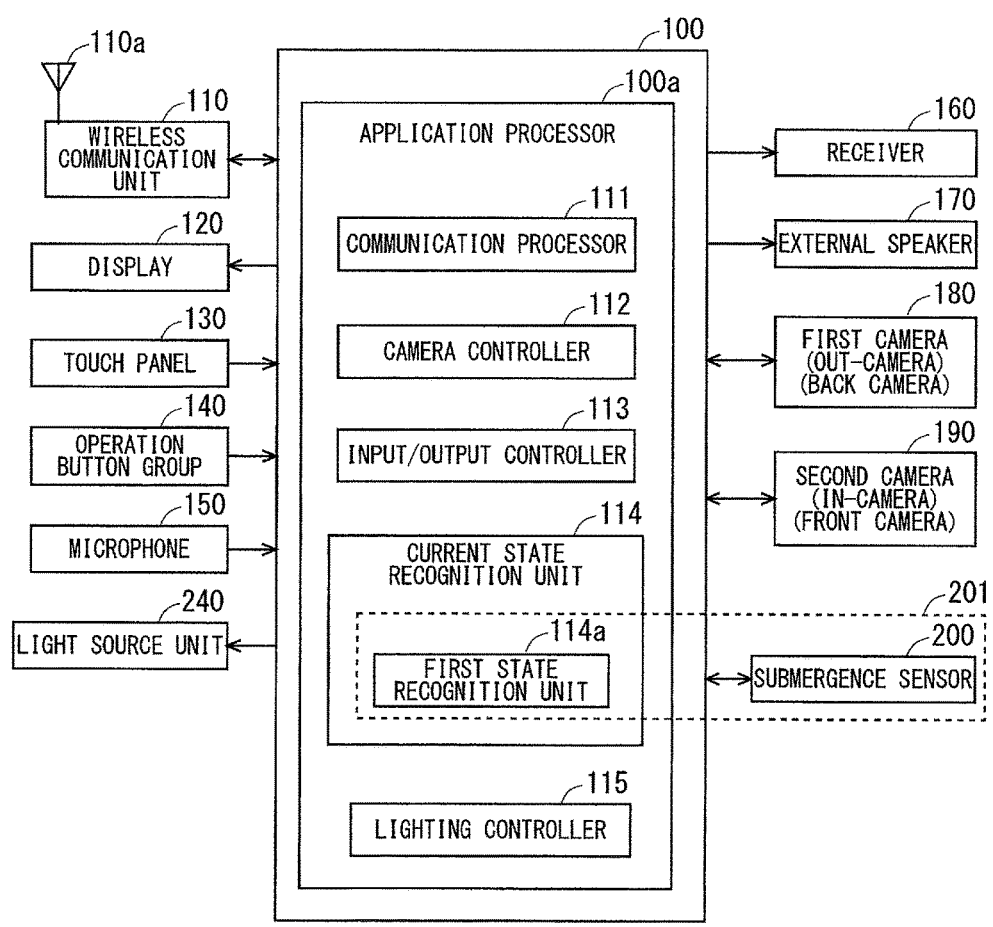
FIG. 4 schematically illustrates an example of an internal configuration of a controller.

FIG. 4 illustrates a functional block diagram schematically showing an example configuration of the controller 100. The controller 100 includes an application processor 100*a*.

The application processor 100*a* can read and execute, for example, applications stored in the storage 103 to perform various functions of the electronic apparatus 1. The application processor 100*a* can perform, for example, a voice call function, a web browser function, or an email function. The applications to be executed by the application processor 100*a* include, for example, the control program Pg1.

The application processor 100*a* implements functional configurations including a communication processor 111, a camera controller 112, an input/output controller 113, a current state recognition unit 114, and a lighting controller 115. These functional units may be implemented by software. All or some of these functional units may be hardware. These functional units enable the application processor 100*a* to perform a voice call or a video call with a calling party device (also referred to as a "voice calling party device"), which is an external communication apparatus. Similarly to the electronic apparatus 1, the external communication apparatus is, for example, a mobile phone such as a smartphone.

1-3-1. Communication Processor

The communication processor 111 can process communication between the electronic apparatus 1 and the external communication apparatus. This communication processing may involve generating a sound signal and a signal indicative of an image (also referred to as an "image signal") and transmitting these signals to an external communication apparatus through the wireless communication unit 110. Additionally, the communication processing may involve receiving the sound signal and the image signal from the external communication apparatus through the wireless communication unit 110. The communication processor 111 can accordingly receive an incoming call from the external communication apparatus and perform a voice call with the external communication apparatus.

When receiving an incoming call transmitted from a calling party through the wireless communication unit 110, the communication processor 111 can notify the user of the incoming call. For example, the communication processor 111 can output, to the receiver 160 or the external speaker 170, a sound signal corresponding to a predetermined ringtone. The receiver 160 or the external speaker 170 can convert the sound signal into a sound and output the sound.

Figure 5:
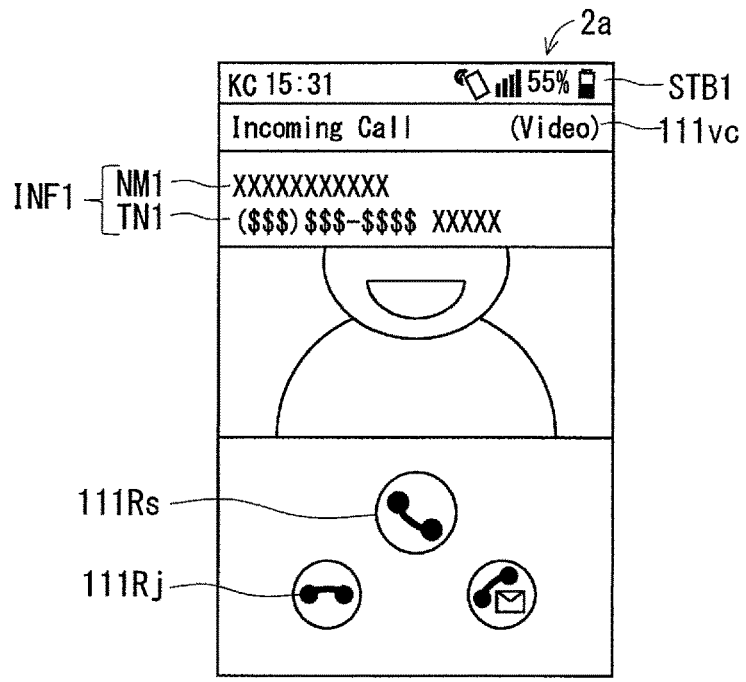
FIG. 5 illustrates example display contents of a display screen associated with an incoming call.

When receiving the incoming call signal, the communication processor 111 can display an incoming call screen on the display 120. An example of the incoming call screen is as shown in FIG. 5. The incoming call screen above shows information INF1 on the calling party. The information INF1 on the calling party may be any piece of information with which the calling party can be identified. Examples of the information INF1 on the calling party include voice call identification numbers (e.g., telephone numbers) assigned to individual electronic apparatuses. In the illustration of FIG. 5, the identification number of the calling party is denoted by a reference sign TN1. Since the identification number is contained in the incoming call signal, the communication processor 111 obtains the identification number of the calling party based on the incoming call signal, and displays the identification number on the display 120.

Information to be displayed on the incoming call screen as the information INF1 on the calling party may include a name. The storage 103 stores, for example, telephone directory information. The telephone directory information includes a plurality of identification numbers and the names of the users corresponding to the identification numbers. The communication processor 111 obtains the identification number contained in the incoming call signal and then identifies the name of the calling party based on the identification number and the telephone directory information. The communication processor 111 can accordingly display the name on the display 120. In the illustration of FIG. 5, the name of the calling party is denoted by a reference sign NM1.

The incoming call screen illustrated in FIG. 5 shows an element 111Rs that functions as an answer button for use in answering an incoming call and an element 111Rj that functions as a rejection button. The incoming call screen illustrated in FIG. 5 also shows an element 111*vc* indicative of an incoming video call. Upon receipt of an incoming voice call, the incoming call screen may show an element indicative of an incoming voice call.

When the user performs an operation on the element 111Rs or the element 111Rj on the incoming call screen, the touch panel 130 detects the operation and outputs the detected operation to the communication processor 111. The operation above may be an operation (a "tap operation") in which the user brings an operator close to the element and then moves the operator away from the element. When being brought close to the element, the operator may be in close proximity to the display screen 2*a* or may be in contact with the display screen 2*a*. The communication processor 111 can start a voice call in response to an operation performed on the element 111Rs and interrupt communication with the calling party in response to an operation performed on the element 111Rj. The above-mentioned operation on the element 111Rs may be a flick operation performed by the user. The flick operation is an operation in which the user flicks the display screen 2*a* with an operator such as a finger or a pen.

In the uppermost part of each of the various screens displayed on the display screen 2*a* such as the incoming call screen, a status bar STB1 may be displayed on an as-needed basis. The status bar STB1 is a display area on which icons indicating the current status of the electronic apparatus 1 may be displayed.

In response to the user's input, the communication processor 111 can transmit an outgoing call signal to the calling party through the wireless communication unit 110. For example, the user can specify the calling party device using a contact list (also referred to as "contact information" or a "telephone directory") stored in the storage 103. The contact list contains a plurality of personal information entries. Each personal information entry includes the name of a person and the corresponding device identification information for use in identifying the device (e.g., mobile phone) owned by the person. The device identification information includes, for example, a telephone number, an email address, and an identification number for use in a specific application. In each personal information entry, each person's name may be associated with his/her facial image. The electronic apparatus 1 can perform a voice call with the calling party device by using the device identification information, which is for use in identifying the calling party device. The following will describe how the electronic apparatus 1 performs a voice call through the use of a telephone number. Alternatively, the electronic apparatus 1 may use identification information other than the telephone number to perform a voice call.

Figure 6:
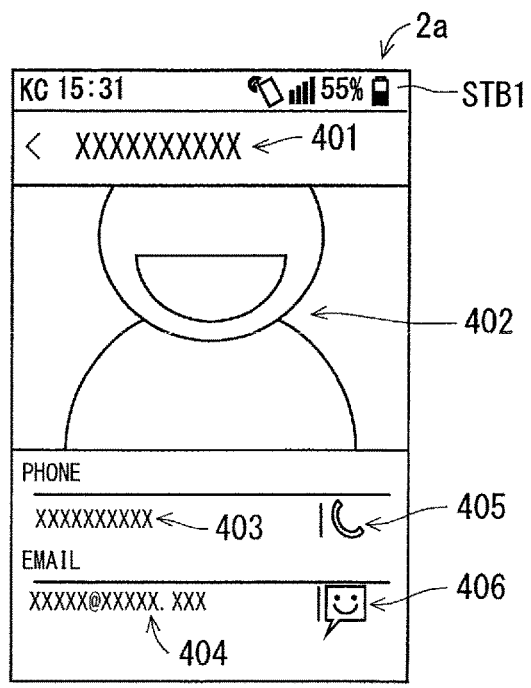
FIG. 6 illustrates example display contents of the display screen associated with an outgoing call.

The user can instruct the electronic apparatus 1 to perform a voice call or a video call in the state in which the electronic apparatus 1 displays personal information on one of the persons on the contact list. For example, the user can operate the electronic apparatus 1 to display, on the display screen 2a, a personal information screen including a piece of personal information contained in the contact list. An example of the personal information screen is as shown in FIG. 6. The personal information screen includes various pieces of information contained in the personal information. In the illustration of FIG. 6, the personal information screen includes a name 401, a facial image 402, a telephone number 403, and an email address 404 that are contained in the personal information. Additionally, the personal information screen includes a call button 405 and a mail submission button 406.

When the call button 405 is tapped, the controller 100 reads the call application from the storage 103 and then executes the call application. When being instructed by the user to perform a voice call, the electronic apparatus 1 can originate a voice call to the calling party device identified by the telephone number 403 on the personal information screen including the call button 405 that has been tapped (to the calling party device to which the telephone number 403 is assigned). When originating the call, the electronic apparatus 1 transmits its own telephone number to the calling party device. The call button 405 may be a button for originating a voice call or a button for originating a video call. Alternatively, a call button for originating a voice call and another call button for originating a video call may be placed separately from each other. Still alternatively, one of these call buttons may be selectively enabled according to, for example, operations or settings performed by the user or the like.

When the mail submission button 406 is tapped, the controller 100 reads a mail application from the storage 103 and then executes the mail application. The controller 100 can display, on the display 120, a message draft screen on which the user can write an outgoing message. The user can write an outgoing message on the message draft screen and instruct the electronic apparatus 1 to send the outgoing message. Upon receipt of the instruction, the electronic apparatus 1 sends the outgoing message written by the user to the calling party device identified by the email address 404 on the personal information screen including the mail submission button 406 that has been tapped (to the calling party device to which the email address 404 is assigned). The user can operate the display screen 2a, thereby causing the electronic apparatus 1 to switch the personal information screen displayed on the display screen 2a to another personal information screen showing personal information on a different person.

The communication processor 111 can, for example, display an outgoing call screen on the display 120. The outgoing call screen shows, for example, elements that function as the input buttons for use in inputting an identification number and an element that functions as an instruction button for use in originating a call. When the user inputs an identification number and then provides an instruction to originate a call using these elements, the touch panel 130 detects the operations of the user and outputs the operations to the communication processor 111. The communication processor 111 transmits, in response to the operations, an outgoing call signal to the calling party to which the relevant identification number is assigned. When the calling party answers the call, the communication processor 111 starts a voice call. When the calling party rejects the call, the communication processor 111 interrupts the communication between the user and the calling party.

During a voice call, the communication processor 111 can output, through the receiver 160 or the like, a sound signal received from the calling party and transmit, to the calling party, a sound signal input through the microphone 150. The user and the calling party can accordingly perform the voice call. In other words, the user of the electronic apparatus 1 and the user of the calling party device can communicate with each other in real time.

During a video call, the communication processor 111 can output, through the external speaker 170, a sound signal received from the calling party and cause the display 120 to output an image signal received from the calling party. During the video call, the communication processor 111 can also transmit, to the calling party, a sound signal input through the microphone 150 and an image signal acquired in the video shooting through the use of the out-camera 180 or the in-camera 190.

While the user of the electronic apparatus 1 is looking at the display screen 2a during a video call, the user is shown in a video captured by the in-camera 190. Likewise, while the user of the calling party device is looking at a display screen of a display during the video call, the user is shown in a video captured by an in-camera of the calling party device. The user of the electronic apparatus 1 and the user of the calling party device can communicate with each other in real time while looking at each other (looking at, for example, the face of the other party).

The video call is also referred to as, for example, a "video phone". Unless otherwise specified, the "user" in the description below means the user of the electronic apparatus 1. The user of the electronic apparatus 1 is also referred to as a "first party user". The user of the calling party device with which the electronic apparatus 1 communicates is also referred to as a "second party user".

The communication processor 111 can display, on the display 120, a screen designed for a voice call (also referred to as a "voice call screen") or a screen designed for a video call (also referred to as a "video call screen").

Figure 7:
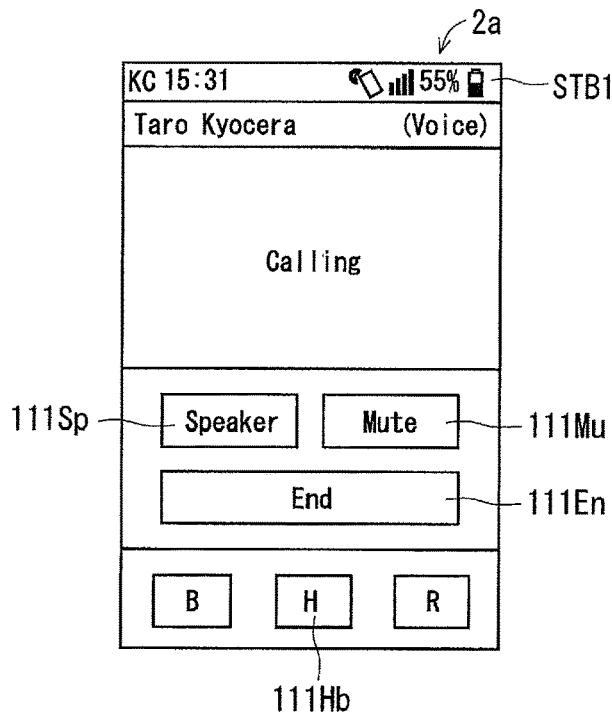
FIG. 7 illustrates example display contents of the display screen associated with a voice call.

An example of the voice call screen is as shown in FIG. 7. The voice call screen shows an element 111En that functions as a call end button. When the user performs an operation on the element 111En, the operation is detected by the touch panel 130 and then is input to the communication processor 111. Upon receipt of the operation, the communication processor 111 ends the voice call. The voice call screen illustrated in FIG. 7 also shows an element 111Hb. The element 111Hb functions as a button for use in replacing the voice call screen displayed on the display 120 with the home screen. When the user performs an operation on the element 111Hb, the operation can be detected by the touch panel 130 and input to the controller 100. Upon receipt of the operation, the controller 100 can stop displaying the voice call screen and display the home screen on the display 120.

Additionally, the voice call screen illustrated in FIG. 7 shows an element 111Sp and an element 111Mu. The element 111Sp functions as a button for use in switching from the audio output through the receiver 160 to the audio output through the external speaker 170. When the user performs an operation on the element 111Sp, the operation can be detected by the touch panel 130 and input to the controller 100. Upon receipt of the operation, the controller 100 can stop outputting a sound through the receiver 160 and start outputting a sound through the external speaker 170.

The element 111Mu functions as a button for use in disabling the audio input to the electronic apparatus 1 and the audio output from the electronic apparatus 1. In other words, the element 111Mu functions as the button for use in enabling a mute function. When the user performs an operation on the element 111Mu, the operation can be detected by the touch panel 130 and input to the controller 100. Upon receipt of the operation, the controller 100 can stop the audio output through the receiver 160 and the external speaker 170, and can also stop the audio input through the microphone 150.

Figure 8:
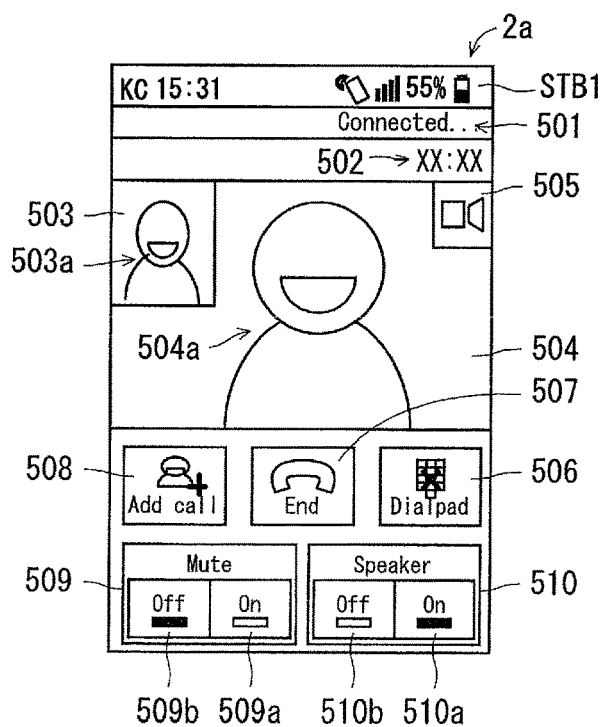
FIG. 8 illustrates example display contents of the display screen associated with a video call.

An example of the video call screen is as shown in FIG. 8. The video call screen shows a string 501 and call duration 502. The string 501 indicates that a video call is now being performed. The video call screen shows, in real time, a first video 503 captured by the in-camera 190 of the electronic apparatus 1. The video call screen also shows, in real time, a second video 504 captured by the calling party device, in other words, the second video 504 transmitted from the calling party device to the electronic apparatus 1 during the video call. In the illustration of FIG. 8, a first party user 503a is shown in the first video 503 and a second party user 504a is shown in the second video 504. In addition, the video call screen shows a camera control button 505, a dial pad button 506, a call end button 507, a conference call button 508, a mute control button 509, and a speaker control button 510.

The camera control button 505 is a button for use in controlling the in-camera 190. When the user performs a predetermined operation (e.g., a tap operation) on the camera control button 505 while the in-camera 190 is in action, the controller 100 stops the in-camera 190. In other words, the electronic apparatus 1 performs a camera stop function. Then, the in-camera 190 stops capturing a video, and the electronic apparatus 1 accordingly stops transmitting the video to the calling party device. Consequently, the video captured by the electronic apparatus 1 is not displayed on the calling party device. In addition, the first video 503 is not displayed on the video call screen.

When the user performs a predetermined operation (e.g., a tap operation) on the camera control button 505 in the state in which the in-camera 190 is not in action, the controller 100 activates the in-camera 190. In other words, the electronic apparatus 1 stops performing the camera stop function. Then, the in-camera 190 resumes capturing a video, and the electronic apparatus 1 resumes transmitting the video to the calling party device. The calling party device accordingly resumes displaying the video captured by the electronic apparatus 1. In addition, the first video 503 is displayed on the video call screen again. When starting a video call with the calling party device, the electronic apparatus 1 does not perform the camera stop function and the in-camera 190 accordingly goes into action.

In some embodiments, when the camera control button 505 is tapped, the display screen 2a may stop showing the second video 504. Then, when the camera control button 505 is tapped in the state in which the second video 504 is not displayed on the display screen 2a, the second video 504 is displayed on the display screen 2a again.

The dial pad button 506 is for use in switching between displaying and non-displaying of a dial pad. The user can perform an operation (e.g., a tap operation) on the dial pad button 506 to prompt the switching between displaying and non-displaying of the dial pad on the display screen 2a. The function of the dial pad button 506 may be restricted in such a manner that the electronic apparatus 1 accepts no operations on the dial pad button 506 during the video call except in a case where the user operates the conference call button 508 to add another calling party to the video call. In the illustration of FIG. 8, a cross placed on the dial pad button 506 indicates that no operations on the dial pad button 506 are acceptable. The dial pad button 506 having the cross placed thereon may be replaced with the dial pad button 506 that is grayed out.

The conference call button 508 is for use in performing a conference call function. The user can perform a predetermined operation (e.g., a tap operation) on the conference call button 508 to cause the electronic apparatus 1 to add another calling party (another calling party device with which the electronic apparatus 1 performs a video call). When the conference call button 508 is tapped, the above-mentioned personal information screen may be displayed on the display screen 2a. When the user operates the call button 405 included in the personal information screen, the electronic apparatus 1 can originate a video call to a device identified by the telephone number 403 on the personal information screen. This device is added as a participant of the voice call. Then, the conference call is accordingly started. In the case where the function of the dial pad button 506 is restricted as mentioned above, the electronic apparatus 1 may, in response to a tap operation on the conference call button 508, accept operations performed on the dial pad button 506. In response to the user's tap operation on the dial pad button 506, the dial pad is displayed on the display screen 2a. When the user operates the displayed dial pad to input a telephone number, the electronic apparatus 1 originates a video call to a device to which the input telephone number is assigned. The device is added as a participant in the voice call. Then, the conference call is accordingly started. Once the calling party is added, the electronic apparatus 1 will accept no more operations on the dial pad button 506 while the function of the dial pad button 506 is restricted as mentioned above.

The call end button 507 is for use in ending a video call. When the user performs a predetermined operation (e.g., a tap operation) on the call end button 507, the electronic apparatus 1 may end a video call.

The mute control button 509 is for use in controlling the mute function of the microphone 150. The mute control button 509 includes an on button 509a for use in enabling the mute function and an off button 509b for use in disabling the mute function. In response to a predetermined operation (e.g., a tap operation) on the on button 509a, the electronic apparatus 1 enables the mute function of the microphone 150. While the mute function is active, the controller 100 does not supply power to the microphone 150. Thus, no sound received by the electronic apparatus 1 through the microphone 150 is transmitted to the calling party device. In this state, the second party user performing the video call cannot hear the voice of the user of the electronic apparatus 1. When the user performs a predetermined operation (e.g.; a tap operation) on the off button 509b, the electronic apparatus 1 disables the mute function of the microphone 150. The controller 100 starts supplying power to the microphone 150 and then transmits a sound received by the electronic apparatus 1 through the microphone 150 to the calling party device through the use of the wireless communication unit 110. This enables the second party user to hear the voice of the user of the electronic apparatus 1 during the video call. When the electronic apparatus 1 starts a video call with the calling party device, the mute function is inactive. When the on button 509a is tapped after the start of the video call, the mute function is enabled.

The speaker control button 510 is for use in controlling a speakerphone function. The speaker control button 510 includes an on button 510a for use in enabling the speakerphone function and an off button 510b for use in disabling the speakerphone function. When the user performs a predetermined operation (e.g., a tap operation) on the on button 510a, the electronic apparatus 1 enables the speakerphone function. The controller 100 causes the external speaker 170, instead of the receiver 160, to output a sound transmitted from the calling party device. This enables the user of the electronic apparatus 1 to hear the voice of the second party user without the need to bring the electronic apparatus 1 close to his/her ear. When the user performs a predetermined operation (e.g., a tap operation) on the off button 510b, the electronic apparatus 1 disables the speakerphone function. The controller 100 causes the receiver 160, instead of the external speaker 170, to output a sound transmitted from the calling party device. When the electronic apparatus 1 starts a video call with the calling party device, the speakerphone function automatically becomes active. When the off button 510b is tapped after the start of the video call, the speakerphone function is disabled.

1-3-2. Current State Recognition Unit

The current state recognition unit 114 can recognize the state of the electronic apparatus 1 (hereinafter also referred to as the "current state" of the electronic apparatus 1). Examples of the current state include a submergence state in which the apparatus 3 is located underwater. The current state recognition unit 114 may include a first state recognition unit 114a.

The first state recognition unit 114a can acquire an electrical signal output by the submergence sensor 200 according to the measured physical quantity and determine the physical quantity based on the electrical signal. Then, the first state recognition unit 114a can compare the determined physical quantity with a predetermined threshold to recognize whether the submergence state exists. Examples of such a physical quantity that can be determined by the first state recognition unit 114a include pressure and electrostatic capacity as mentioned above. The submergence sensor 200 and the first state recognition unit 114a may constitute the submergence detector 201 capable of detecting the state in which the out-camera 180 is located underwater, or, the apparatus case 3 is located underwater.

1-3-3. Camera Controller

The camera controller 112 can control actions of the out-camera 180 and actions of the in-camera 190. The camera controller 112 can control the actions of the out-camera 180 and the actions of the in-camera 190 according to the current state of the electronic apparatus 1 recognized by the current state recognition unit 114. Specifically, when the submergence state is detected by the submergence detector 201, the camera controller 112 can cause the out-camera 180 to start capturing a video. During a video call, the first party user can submerge the electronic apparatus 1 in water and take out the electronic apparatus 1 from the water, thereby switching between the out-camera 180 and the in-camera 190 for video shooting. This eliminates the user having to perform additional operation on the electronic apparatus 1 specifically for the switching between these cameras, and can accordingly improve the operability of the electronic apparatus 1. This can lead to improved control over video shooting through the use of a camera suitable for the current state of the electronic apparatus 1.

While the first party user performs a video call through the use of a video captured by the in-camera 190, the first party user may want to shoot a video of the underwater view and to show the video to the second party user. Unfortunately, the first party user cannot easily operate the touch panel 130 in water. The first party user has to put up with inconvenience of switching from the in-camera 190 to the out-camera 180 before submerging the electronic apparatus 1 in water. This switching operation impairs operability. Also, the first party user will probably miss timing on shooting. In some cases, the first party user is unable to switch from the in-camera 190 to the out-camera 180 with his/her hands full.

In this embodiment, meanwhile, the first party user can start shooting a video through the use of the out-camera 180, instead of the in-camera 190, just by submerging the electronic apparatus 1 in water. Assume that the underwater view through the out-camera 180 is shown in a video captured by the out-camera 180. In this case, a video signal indicative of the video captured by the out-camera 180 and a sound signal indicative of a sound input through the microphone 150 can be transmitted from the electronic apparatus 1 to the calling party device through the wireless communication unit 110 during the video call. Upon receipt of the video signal and the sound signal from the electronic apparatus 1, the calling party device visually outputs the video signal and audibly outputs the sound signal. The second party user can thus communicate with the first party user while looking at the surroundings of the first party user (e.g., the underwater view).

Figure 9:
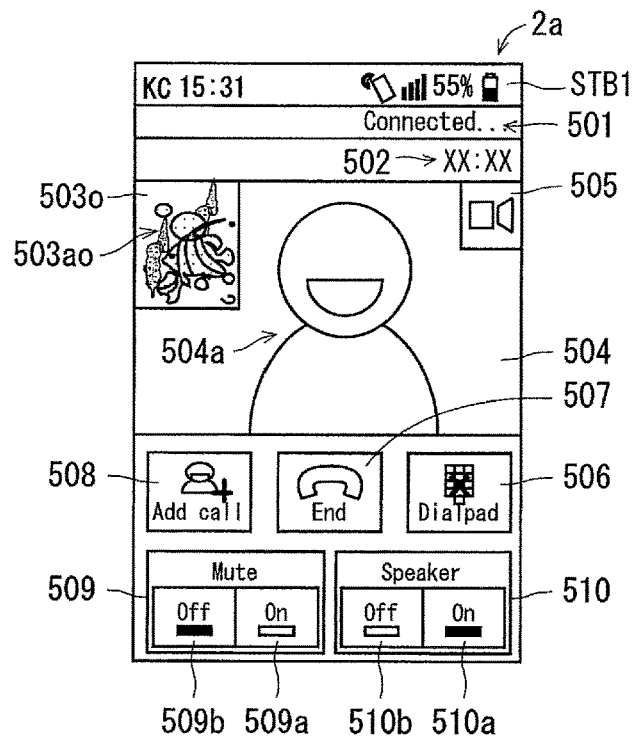
FIG. 9 illustrates example display contents of the display screen associated with a video call.

FIG. 9 shows an example of the video call screen on which a video captured by the out-camera 180 is displayed. The video call screen illustrated in FIG. 9 is similar the video call screen illustrated in FIG. 8, whereas a first video 503o captured by the out-camera 180 of the electronic apparatus 1 replaces the first video 503 captured by the in-camera 190 of the electronic apparatus 1. In the illustration of FIG. 9, the first video 503o shows objects 503ao viewed through the out-camera 180, or, objects 503ao located behind the display screen 2a.

Figure 10:
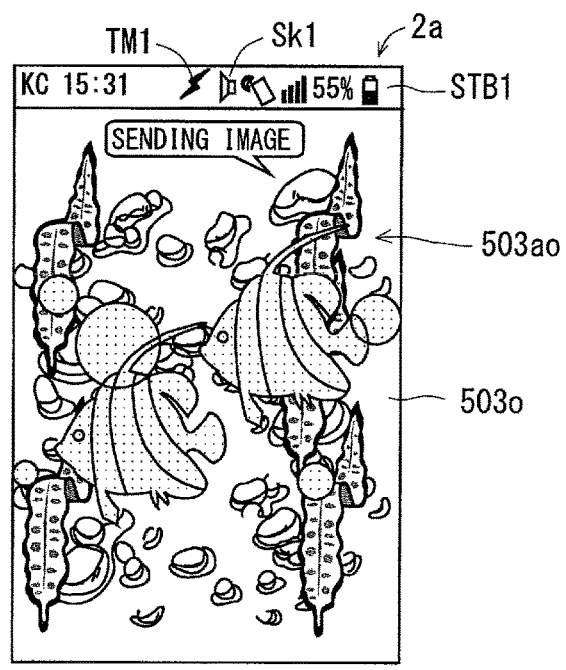
FIG. 10 illustrates example display contents of the display screen associated with a video call.

In the case where the electronic apparatus 1 is submerged in water and the user is thus unable to operate the touch panel 130, the first video 503o captured by the out-camera 180 may be displayed on the video call screen so as to extend almost all over the display screen 2a. An example of the video call screen above is as shown in FIG. 10. In the illustration of FIG. 10, the status bar STB1 shows an icon Sk1 indicative of the state in which a speakerphone function is active, where the first party user can communicate with the second party user without the need to bring the electronic apparatus 1 close to his/her ear or mouth. The first party user can easily view the objects captured by the out-camera 180. Also, the first party user can talk about the objects and let the second party user know what he/she feels about the objects by using the speakerphone function. The display screen 2a of the electronic apparatus 1 illustrated in FIG. 10 may show a video of the second party user 504a displayed on part of the first video 503o.

1-3-4. Input/Output Controller

The input/output controller 113 can function as a unit (also referred to as a "display control unit") that controls visual output of various kinds of information in the display panel 121 of the display 120. The visual output of the various kinds of information can be accordingly controlled on the display screen 2a. The input/output controller 113 can control the visual output of the various kinds of information in the display panel 121 of the display 120 according to the current state of the electronic apparatus 1 recognized by the current state recognition unit 114. When the submergence state is detected by the submergence detector 201, the input/output controller 113 can place, in accordance with a predetermined rule, the display screen 2a in the state (also referred to as a "non-display state") in which no information is displayed on the display screen 2a.

The input/output controller 113 can also control input of a sound signal through the microphone 150. For example, the input/output controller 113 can control whether the sound signal can be input through the microphone 150. Specifically, in response to an act of stopping electric power supply to the microphone 150, the input of the sound signal through the microphone 150 can be disabled in accordance with a predetermined rule.

The input/output controller 113 can control output of a sound signal by the receiver 160 and the external speaker 170. For example, the input/output controller 113 can control audible output of a sound signal by the receiver 160 and the external speaker 170. Specifically, the input/output controller 113 can control which one of the receiver 160 and the external speaker 170 outputs a sound signal. The input/output controller 113 can also control whether each of the receiver 160 and the external speaker 170 can output a sound signal. Specifically, in accordance with a predetermined rule, the electronic apparatus 1 can be placed in a "mute state" in which neither the receiver 160 nor the external speaker 170 outputs a sound signal.

1-3-5. Lighting Controller

The lighting controller 115 can control the lighting of the light source unit 240. The lighting controller 115 can control the turning on/off of the light source unit 240 according to the current state of the electronic apparatus 1 recognized by the current state recognition unit 114.

1-4. Example of a Series of Actions Taken to Control Electronic Apparatus

Figure 11:
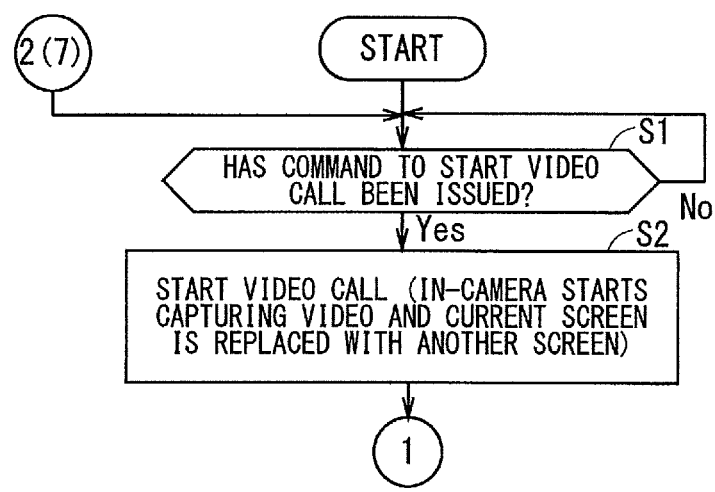
FIG. 11 illustrates a flowchart showing an example of a series of control actions.
Figure 12:
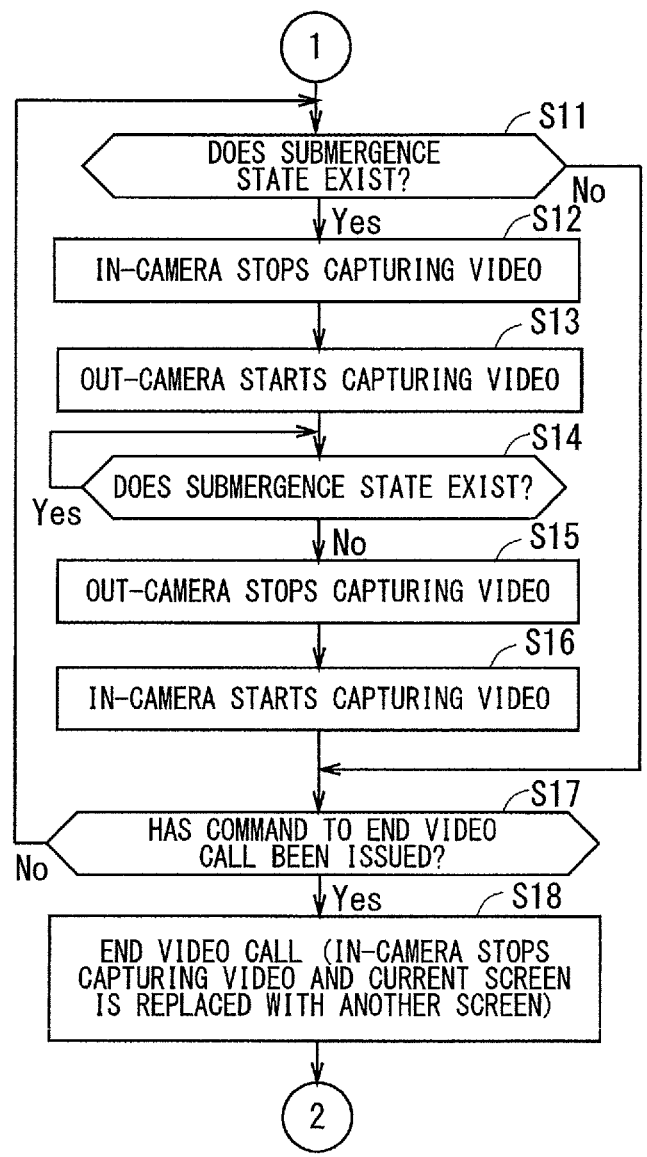
FIG. 12 illustrates a flowchart showing an example of a series of control actions.

The following will describe a series of actions taken to control the electronic apparatus 1, in other words, the actual implementation of a method for controlling the electronic apparatus 1 in a manner to control video shooting actions of the out-camera 180. FIGS. 11 and 12 each illustrate a flowchart showing an example of a series of actions taken to control the electronic apparatus 1. These actions in FIGS. 11 and 12 can be implemented by various functions of the controller 100 including the communication processor 111, the camera controller 112, and the current state recognition unit 114. The various functions can be implemented based on the execution of the control program Pg1 by the controller 100. That is to say, the control actions in FIGS. 11 and 12 can be implemented based on the execution of the control program Pg1 by the controller 100.

In Step S1 of FIG. 11, the communication processor 111 determines whether a command to start a video call has been issued. For example, the touch panel 130 detects an operation performed by the user on the display screen 2a, so that such a command to start a video call is issued. A video call can be started when the first party user answers an incoming call from the second party user or when the second party user answers an incoming call from the first party user. The communication processor 111 repetitively makes determination in Step S1 until such a command to start a video call is issued. If the command to start a video call is issued, Step S2 is performed.

In Step S2, the communication processor 111 starts a video call. At the same time, the in-camera 190 starts capturing a video and the screen displayed on the display screen 2a is replaced with another screen. For example, the input/output controller 113 may start displaying the video call screen on the display screen 2a. After the processing of Step S2, Step S11 of FIG. 12 is performed.

In Step S11 of FIG. 12, the controller 100 determines whether the submergence state exists. The submergence detector 201 can detect the submergence state in which the out-camera 180 is located underwater based on the physical quantity that varies when the electronic apparatus 1 is submerged. If the submergence state is detected, Step S12 is performed. If no such submergence state is detected, Step S17 is performed.

In Step S12, the camera controller 112 causes the in-camera 190 to stop capturing a video.

In Step S13, the camera controller 112 causes the out-camera 180 to start capturing a video. If the submergence state is detected in Step S11, the camera controller 112 causes the out-camera 180 to start capturing a video. The control over the video shooting actions of the out-camera 180 can improve the operability of the electronic apparatus 1. This can lead to improved control over video shooting through the use of a camera suitable for the current state of the electronic apparatus 1.

In the case where the electronic apparatus 1 performs a voice call with the external communication apparatus through the communication processor 111, when the submergence state is detected by the submergence detector 201, the camera controller 112 causes the out-camera 180 to start capturing a video. Thus, the user can readily shoot a video of the underwater view during the voice call.

When the submergence state is detected by the submergence detector 201, the camera controller 112 causes the in-camera 190 to stop capturing a video and then causes the out-camera 180 to start capturing a video. Thus, the user can readily switch from the in-camera 190 to the out-camera 180 to shoot a video for use in the video call. For example, the first video 503 captured by the in-camera 190 may be easily replaced with the first video 503o captured by the out-camera 180 on the video call screen.

In a case where a video call between the electronic apparatus 1 and the external communication apparatus, namely, the calling party device is performed and an image captured by the in-camera 190 is transmitted from the electronic apparatus 1 to the calling party device by the communication processor 111 during the video call, when the submergence state is detected by the submergence detector 201, the camera controller 112 causes the out-camera 180 to start capturing a video. The communication processor 111 starts transmitting the image captured by the out-camera 180 to the external communication apparatus, namely, the calling party device.

In Step S14, the controller 100 determines whether the submergence state exists as in Step S11. The controller 100 may repetitively make determination in Step S14 until the submergence state ceases. If the submergence state ceases, Step S15 may be performed. If the submergence state is no longer detected by the submergence detector 201, the ceasing of the submergence state may be recognized.

In Step S15, the camera controller 112 causes the out-camera 180 to stop capturing a video.

In Step S16, the camera controller 112 causes the in-camera 190 to start capturing a video. If the ceasing of the submergence state is detected by the submergence detector 201 in Step S14, the camera controller 112 causes the in-camera 190, in place of the out-camera 180, to capture a video. When the shooting of a video of the underwater view ceases, the electronic apparatus 1 can be placed back in the original video call state.

In Step S17, the controller 100 determines whether a command to end the video call has been issued. For example, the touch panel 130 detects an operation performed on the display screen 2a by the user, so that such a command to end the video call is issued. If no such command to end the video call has been issued, Step S11 is performed again. If the command to end the video call has been issued, Step S18 is performed.

In Step S18, the communication processor 111 ends the video call, and then, Step S1 of FIG. 11 is performed again.

When the electronic apparatus 1 is powered off, the controller 100 may stop executing the control program Pg1 and these example control actions may be ended accordingly.

As described above, when the electronic apparatus 1 including the out-camera 180 according to one embodiment is submerged in water, the out-camera 180 starts capturing a video. Thus, the user can start shooting a video through the use of the out-camera 180 just by submerging the electronic apparatus 1 in water. The electronic apparatus 1 can accordingly have enhanced operability in terms of video shooting through the use of a camera suitable for its current state. This can lead to improved control over video shooting through the use of a camera suitable for the current state of the electronic apparatus 1.

2. Modifications

Figure 13:
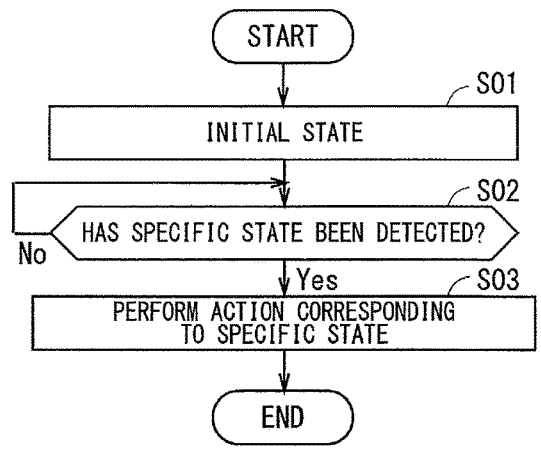
FIG. 13 illustrates a flowchart schematically showing an example of a series of control actions.

As illustrated in FIG. 13, a series of control actions may be performed in the following manner. In a case where the electronic apparatus 1 is placed in an initial state in Step S01, when a specific state of the electronic apparatus 1 is detected in Step S02, an action corresponding to the specific state may be performed in Step S03. The following will specifically describe modifications that conform to such control actions.

2-1. First Modification

Examples of the specific state other than the submergence state include the state in which an object is in close proximity to the electronic apparatus, the state in which the brightness of a captured image is not high, the state in which the electronic apparatus is moving at a high speed, and the state in which the front surface 1a faces downward. When such a specific state is detected, the electronic apparatus may perform an action corresponding to the specific state.

2-1-1. Electrical Configuration of Electronic Apparatus

Figure 14:
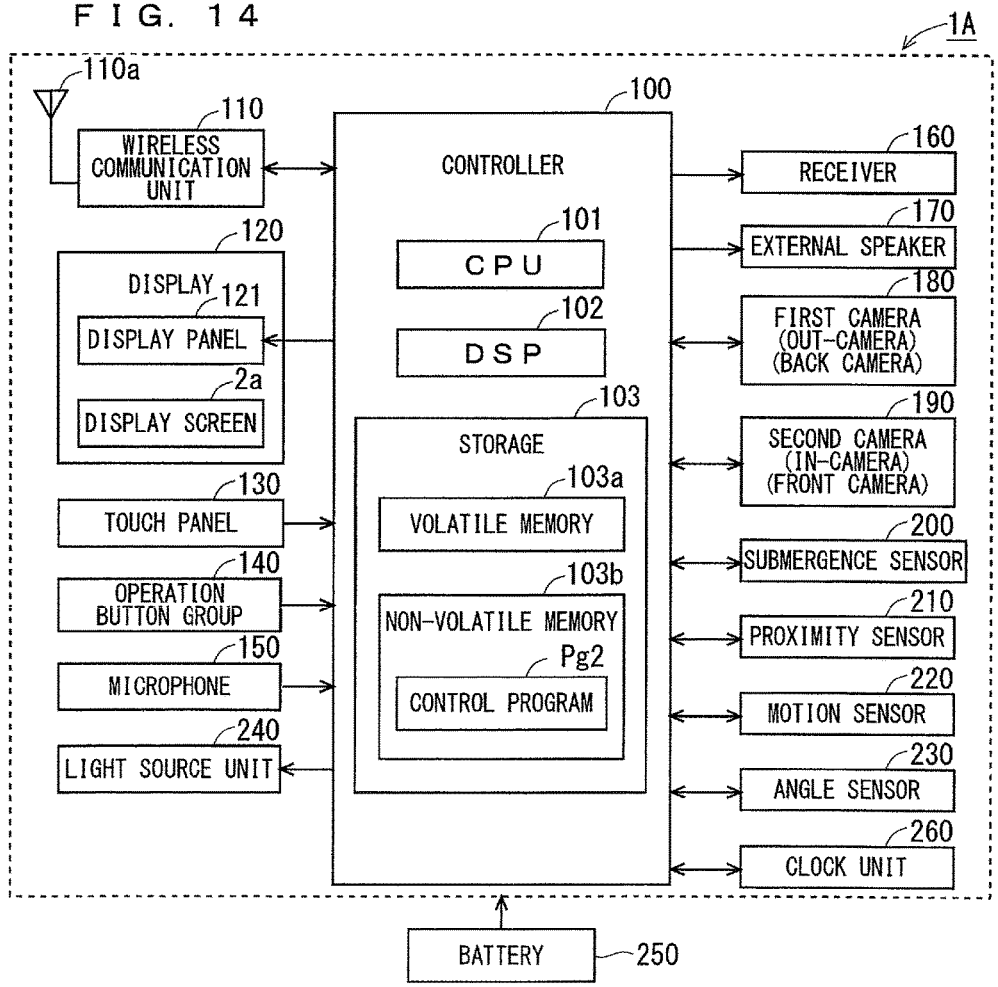
FIG. 14 illustrates an example of an electrical configuration of the electronic apparatus.

FIG. 14 illustrates an example of an electrical configuration of the electronic apparatus 1A according to a first modification. The electronic apparatus 1A includes, in addition to the constituent components of the electronic apparatus 1 according to one embodiment mentioned above, a proximity sensor 210, a motion sensor 220, and an angle sensor 230, and also includes a control program Pg2 in place of the control program Pg1.

The proximity sensor 210 and the controller 100 constitute a proximity detector 211 (see FIG. 15) that can detect the state in which an object is in close proximity to the front surface 1a of the electronic apparatus 1A. That is, the proximity detector 211 can detect the state in which an object is in close proximity to the front surface 1a. This state is also referred to as a "proximity state". The proximity state may occur when the user's chest is in close proximity with the front surface 1a of the electronic apparatus 1A hung from an attached strap around his/her neck. The user supposedly hangs the electronic apparatus 1A from the strap around his/her neck to shoot a video or to take a picture with the electronic apparatus 1A when it is difficult for the user to hold the electronic apparatus 1A in his/her hand.

The proximity sensor 210 can measure a physical quantity that varies according to the proximity of an object to the front surface 1a. The proximity sensor 210 can output, to the controller 100, an electrical signal corresponding to the measured physical quantity. Example of such a physical quantity that varies according to the proximity of an object include electrostatic capacity and the strength gained by the ultrasonic wave reflection.

The proximity sensor 210 may be a capacitive proximity sensor utilizing static electricity. For example, the capacitive proximity sensor detects variations in electrostatic capacity in a capacitor including an insulator and electrodes that sandwich the insulator. Then, the capacitive proximity sensor outputs, to the controller 100, an electrical signal corresponding to variations in electrostatic capacity caused by the proximity of an object. Specifically, when an electrostatic capacity exceeds a predetermined threshold due to the proximity of an object, an oscillator circuit starts oscillating. Then, the capacitive proximity sensor outputs an electrical signal corresponding to the detected oscillation state. The controller 100 can recognize, based on the electrical signal input from the capacitive proximity sensor, the state in which the object is in close proximity to the front surface 1a. For example, the electrostatic capacity in the state in which an object is in close proximity to the front surface 1a is measured in advance, and then, the value corresponding to this actually measured electrostatic capacity may be used as the predetermined threshold as required.

Alternatively, the proximity sensor 210 may be an ultrasonic sensor including a transmitter and a receiver. The transmitter transmits ultrasonic waves to the outside and the receiver receives reflected waves, so that the ultrasonic sensor can detect the presence or absence of an object. The ultrasonic sensor can measure the strength of reflected waves received by the receiver, convert the measured strength of reflected waves into an electrical signal, and output the electrical signal to the controller 100. The controller 100 can determine the value of the strength of reflected waves based on the electrical signal input from the ultrasonic sensor. The controller 100 can recognize the state in which the object is in close proximity to the front surface 1a based on the determined value of the strength of reflected waves. For example, the strength of reflected waves determined by the controller 100 in the state in which an object is in close proximity to the front surface 1a is measured in advance, and then, the value corresponding to the strength of reflected waves above may be used as a predetermined threshold as required. Still alternatively, the proximity detector 211 may include the controller 100 and two or more sensors such as the capacitive proximity sensor and the ultrasonic sensor.

The motion sensor 220 and the controller 100 constitute a motion detector 221 (see FIG. 15) that can detect the state in which the electronic apparatus 1A is moving at a speed greater than or equal to a predetermined speed (hereinafter also referred to as a "reference speed"). That is, the motion detector 221 can detect the state in which the electronic apparatus 1A is moving at a speed greater than or equal to the predetermined reference speed. This state is also referred to as a "high-speed movement state". The high-speed movement state may occur when the user is running or riding in a vehicle, with the electronic apparatus 1A being hung from an attached strap around his/her neck. The user supposedly hangs the electronic apparatus 1A from the strap around his/her neck to shoot a video or to take a picture with the electronic apparatus 1A when it is difficult for the user to hold the electronic apparatus 1A in his/her hand.

The motion sensor 220 can measure a physical quantity that varies according to the movement of the electronic apparatus 1A. The motion sensor 220 can output, to the controller 100, an electrical signal corresponding to the measured physical quantity. Examples of such a physical quantity that varies according to the movement above include acceleration.

The motion sensor 220 may include, for example, an accelerometer. The accelerometer can measure an acceleration generated in the electronic apparatus 1A, convert the measured value of acceleration into an electrical signal, and output the electrical signal to the controller 100. The controller 100 can determine the value of acceleration based on the electrical signal input from the accelerometer and obtain the value of movement speed from the determined value of acceleration. The controller 100 can compare the value of movement speed with the reference speed, thereby detecting the state in which the electronic apparatus 1A is moving at a speed greater than or equal to the predetermined reference speed. For example, the controller 100 can detect the high-speed movement speed when the obtained movement speed is greater than or equal to the reference speed. The accelerometer can measure, for example, acceleration along three directions including X, Y, and Z axes. The motion sensor 220 may include a GPS antenna. The controller 100 can receive a carrier wave from a GPS satellite through the GPS antenna at predetermined intervals and compute a phase shift of the frequency of the received carrier wave. The controller 100 may analyze the computed phase shift based on the Doppler effect to determine the movement speed of the electronic apparatus 1A.

The angle sensor 230 and the controller 100 constitute an orientation detector 231 (see FIG. 15) that can detect the state in which the front surface 1a of the electronic apparatus 1A faces downward. That is, the orientation detector 231 can detect the state in which the front surface 1a of the electronic apparatus 1A faces downward. This state is also referred to as a "face-down orientation state". The face-down orientation state may occur when the user shoots a video of an object or takes a picture of an object using the in-camera 190.

The angle sensor 230 can measure a physical quantity that varies according to the orientation of the front surface 1a. The angle sensor 230 can output, to the controller 100, an electrical signal corresponding to the measured physical quantity. Examples of such a physical quantity that varies according to the orientation of the front surface 1a include the tilt angle of the front surface 1a. The tilt angle may be an angle formed by the front surface 1a with the vertical. For example, the tilt angle formed by the front surface 1a that faces downward takes on a positive value, whereas the tile angle formed by the front surface 1a that faces upward takes on a negative value.

The angle sensor 230 can measure gravitational acceleration, convert the measured value of gravitational acceleration into an electrical signal, and output the electrical signal to the controller 100. The controller 100 can determine, based on the electrical signal input from the angle sensor 230, the value of gravitational acceleration and obtain the value of tilt angle from the determined value of gravitational acceleration. The controller 100 can compute the value of tilt angle based on the fact that the value of gravitational acceleration measured by the angle sensor 230 is equal to the value obtained by multiplying the sine of a tilt angle by the normal earth gravity 1g. The controller 100 can compare the computed value of tilt angle with a predetermined reference angle, thereby detecting face-down orientation state in which the front surface 1a faces downward. If the computed tilt angle is greater than or equal to the reference angle, the controller 100 can detect the face-down orientation state. The reference angle may be set as appropriate and may range from 0 to several tens of degrees. The electronic apparatus 1A may include an accelerometer to measure the physical quantity that varies according to the orientation of the front surface 1a. The controller 100 may compute the value of tilt angle based on an electrical signal input from the accelerometer. The controller 100 may compute the value of tilt angle by using a supplementary value, such as the value computed based on an electrical signal input from a sensor capable of measuring a physical quantity associated with rotation. Examples of such a sensor capable of measuring a physical quantity associated with rotation include an angular velocity sensor and a magnetic field sensor.

2-1-2. Configuration of Controller

Figure 15:
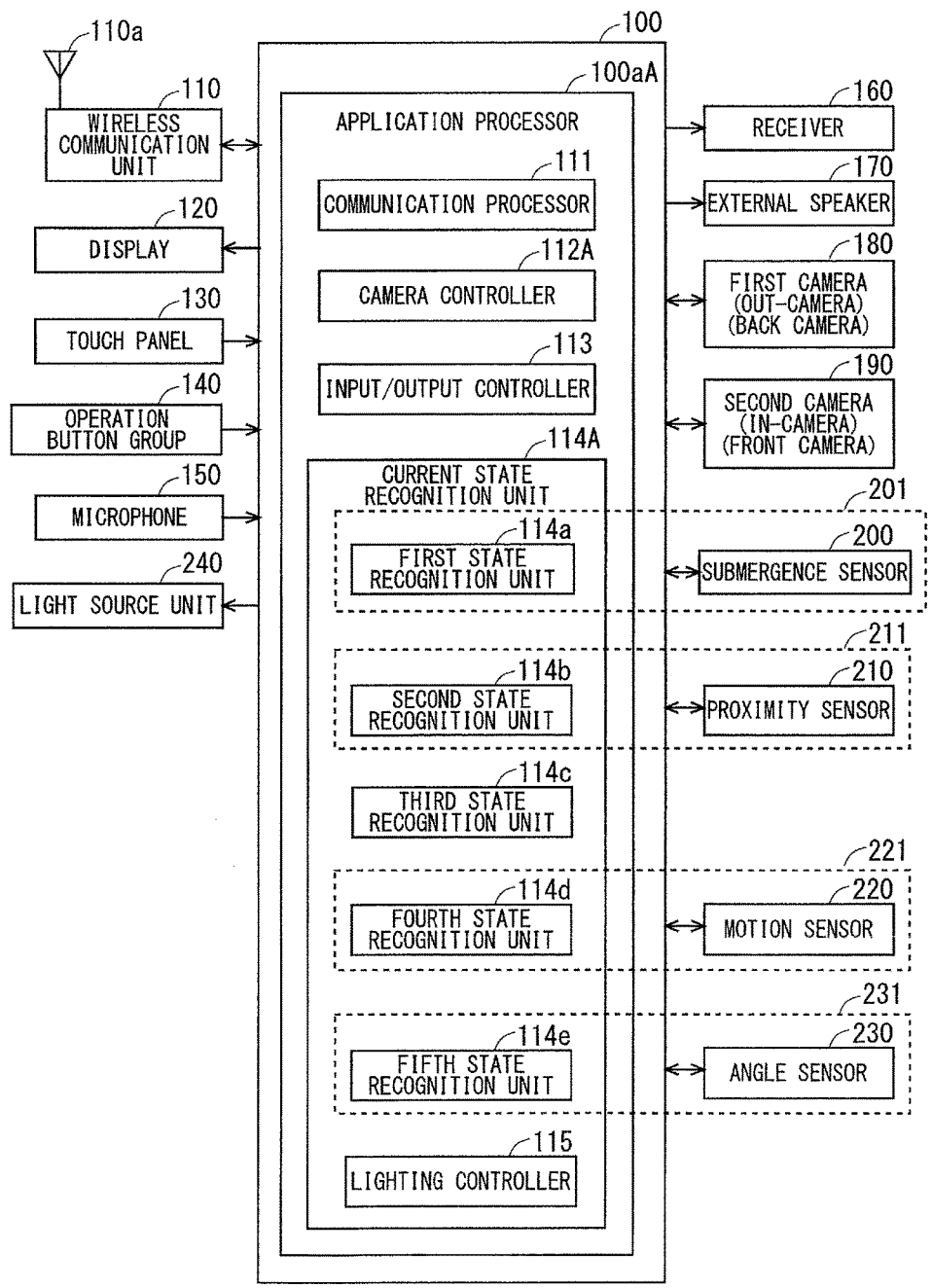
FIG. 15 schematically illustrates an example of the internal configuration of the controller.

FIG. 15 illustrates a functional block diagram schematically showing an example configuration of the controller 100 according to the first modification. The controller 100 according to the first modification is obtained by substituting an application processor 100aA for the application processor 100a implemented by the controller 100 according to one embodiment mentioned above. The application processor 100aA, which serves an extension of the application processor 100a according to one embodiment mentioned above, includes a camera controller 112A and a current state recognition unit 114A in place of the camera controller 112 and the current state recognition unit 114. The current state recognition unit 114A, which serves an extension of the current state recognition unit 114, has additional functions, namely, second to fifth current state recognition units 114b to 114e. The application processor 100aA of the controller 100 can read the control program Pg2 from the storage 103 and execute the control program Pg2, whereby the functional configuration of the controller 100 can be changed as described above. Examples of the current state of the electronic apparatus 1 that can be recognized by the current state recognition unit 114A include, the proximity state, the state in which the brightness of a captured image is not high (hereinafter also referred to as a "low luminance state"), the high-speed movement state, the face-down orientation state, and the like.

The second state recognition unit 114b can acquire an electrical signal output by the proximity sensor 210 according to the measured physical quantity and determine the physical quantity based on the electrical signal. Then, the second state recognition unit 114b can compare the determined physical quantity with a predetermined threshold, thereby recognizing the proximity state. Examples of such a physical quantity to be determined include electrostatic capacity and the strength gained by the ultrasonic wave reflection as mentioned above. The proximity sensor 210 and the second state recognition unit 114b can constitute the proximity detector 211 capable of detecting the proximity state in which the object is in close proximity to the front surface 1a by measuring the physical quantity that varies according to the proximity of an object to the front surface 1a.

The third state recognition unit 114c can recognize the low luminance state in which the brightness of an image captured by the in-camera 190 is not high. The third state recognition unit 114c can compute an evaluation value associated with the brightness of an image captured by the in-camera 190. That is, the third state recognition unit 114c can function as a unit (hereinafter also referred to as a "brightness evaluator") that acquires the evaluation value associated with the brightness of an image captured by the in-camera 190. The evaluation value may be a representative value obtained from pixel values of all or some of the pixels constituting the captured image. Examples of such a representative value include the pixel value of a specific pixel and a statistical value, a maximum value, a minimum value, and a median value obtained from two or more pixels included in a specific area. The specific area may include all or some of the pixels constituting the captured image. The statistical value may be the arithmetic mean. The third state recognition unit 114c can compare the computed evaluation value with a predetermined reference value, thereby recognizing the low luminance state. The predetermined value may be set as required. For example, the evaluation value associated with an image that has been captured by the in-camera 190 in low subject brightness may be computed in advance, and then, this evaluation value may be used as the predetermined reference value. If the evaluation value is smaller than or equal to the reference value, the third state recognition unit 114c may recognize the low luminance state. The third state recognition unit 114c may perform a series of actions including the recognition of the low luminance state or may perform the computation of evaluation value alone.

The low luminance state may occur when the user's chest is in close proximity with the front surface 1a of the electronic apparatus 1A hung from an attached strap around his/her neck. The user supposedly hangs the electronic apparatus 1A from the strap around his/her neck to shoot a video or to take a picture with the electronic apparatus 1A when it is difficult for the user to hold the electronic apparatus 1A in his/her hand.

The fourth state recognition unit 114d can acquire an electrical signal output by the motion sensor 220 according to the measured physical quantity and determine the physical quantity based on the electrical signal. Then, the fourth state recognition unit 114d can compare the determined physical quantity with a predetermined threshold, thereby recognizing the high-speed movement state. Examples of such a physical quantity to be determined include the movement speed as mentioned above. The motion sensor 220 and the fourth state recognition unit 114d can constitute the motion detector 221 capable of detecting the high-speed movement state in which the electronic apparatus 1A is moving at a speed greater than or equal to the predetermined reference speed by measuring the physical quantity that varies according to the movement of the electronic apparatus 1A.

The fifth state recognition unit 114e can acquire an electrical signal output by the angle sensor 230 according to the measured physical quantity and determine the physical quantity based on the electrical signal. Then, the fifth state recognition unit 114e can compare the determined physical quantity with a predetermined threshold, thereby recognizing the face-down orientation state. Examples of such a physical quantity to be determined include the tilt angle as mentioned above. The angle sensor 230 and the fifth state recognition unit 114e can constitute the orientation detector 231 capable of detecting the face-down orientation state in which the front surface 1a faces downward by measuring the physical quantity that varies according to the orientation of the front surface 1a.

When the evaluation value obtained by the third state recognition unit 114c is smaller than or equal to the reference value, the camera controller 112A in the first modification can cause the out-camera 180 to start capturing a video. When an object of the in-camera1 190 is under extremely low light conditions, video shooting through the use of the out-camera 180 is started in the electronic apparatus 1A. The electronic apparatus 1A can accordingly have enhanced operability. This can lead to improved control over video shooting through the use of a camera suitable for the current state of the electronic apparatus 1A.

When the proximity state is detected by the proximity detector 211, the camera controller 112A can cause the out-camera 180 to start capturing a video. When an object is in extremely close proximity to the front surface 1a, video shooting through the use of the out-camera 180 is started in the electronic apparatus 1A. The electronic apparatus 1A can accordingly have enhanced operability. This can lead to improved control over video shooting through the use of a camera suitable for the current state of the electronic apparatus 1A.

When the high-speed movement state is detected by the motion detector 221, the camera controller 112A can cause the out-camera 180 to start capturing a video. While the electronic apparatus 1A is moving at a high speed, it is difficult to perform a video call though the use of the in-camera 190. Thus, video shooting though the use of the out-camera 180 is started in the electronic apparatus 1A. The electronic apparatus 1A can accordingly have enhanced operability. This can lead to improved control over video shooting through the use of a camera suitable for the current state of the electronic apparatus 1A.

When the submergence state is detected by the submergence detector 201 and the face-down orientation state is detected by the orientation detector 231, the camera controller 112A can cause the in-camera 190 to capture a video. In a case where the in-camera 190 is in use, when the electronic apparatus 1A is submerged in water in the face-down orientation state, the in-camera 190 can keep capturing a video based on the supposition that the user wants to shoot a video of the underwater view by using the in-camera 190. In a case where the in-camera 190 is not in use, when the electronic apparatus 1A is submerged in water in the face-down orientation state, the in-camera 190 may start capturing a video based on the supposition that the user wants to shoot a video of the underwater view by using the in-camera 190. The electronic apparatus 1A can accordingly have enhanced operability. This can lead to improved control over video shooting through the use of a camera suitable for the current state of the electronic apparatus 1A.

2-1-3. Example of a Series of Actions Taken to Control Electronic Apparatus

Figure 16:
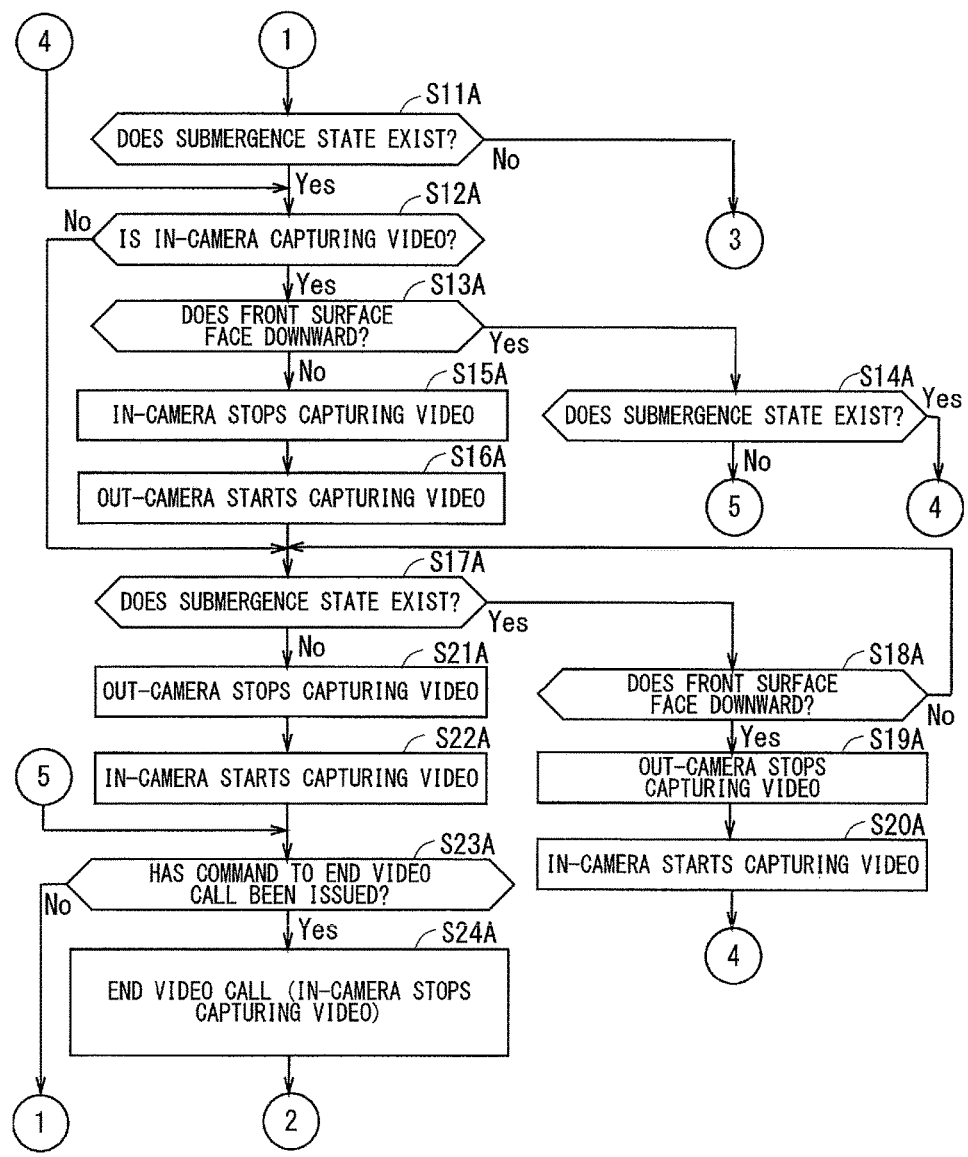
FIG. 16 illustrates a flowchart showing an example of a series of control actions.
Figure 17:
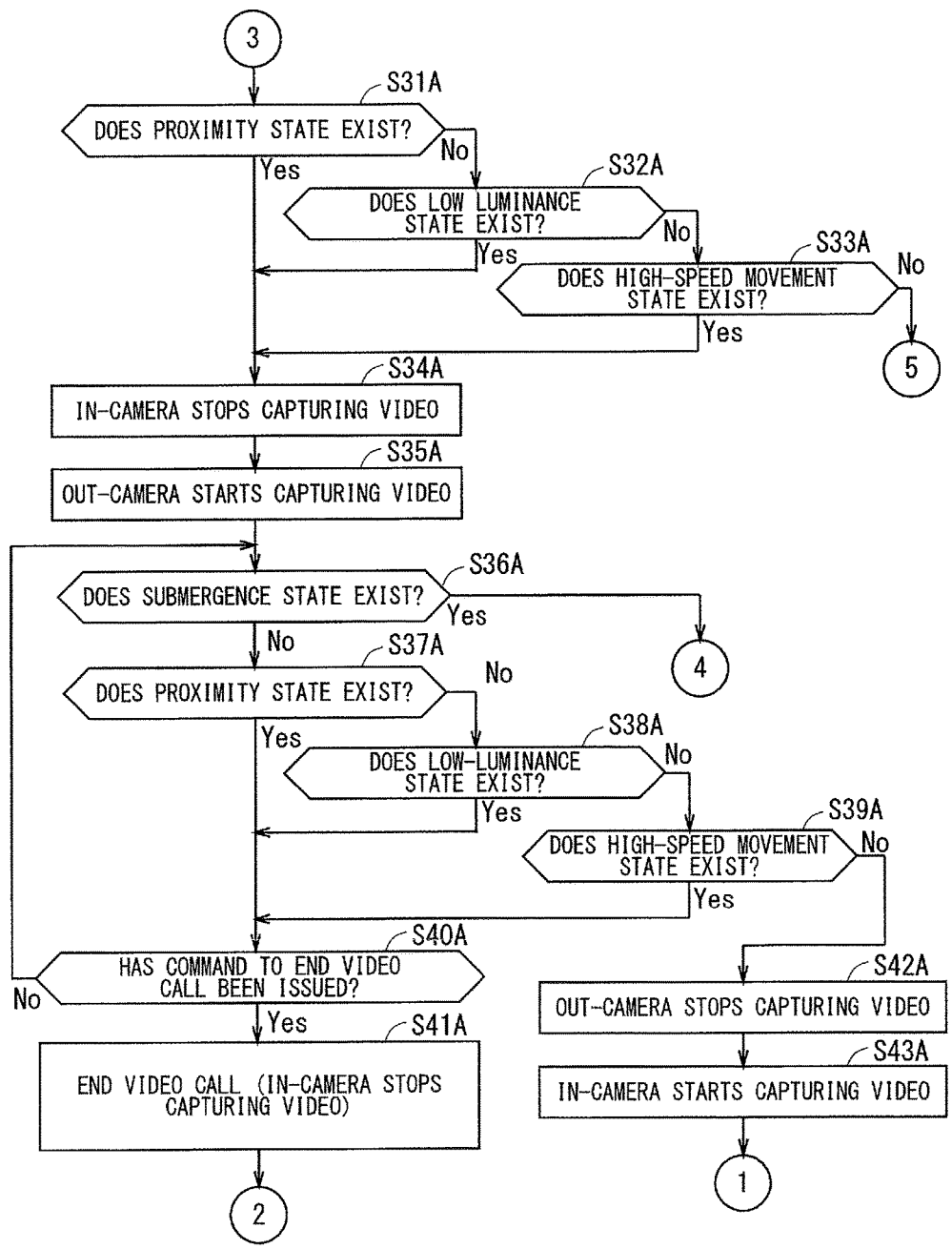
FIG. 17 illustrates a flowchart showing an example of a series of control actions.

The following will describe a series of actions taken to control the electronic apparatus 1A, in other words, the actual implementation of a method for controlling the electronic apparatus 1A in a manner to control video shooting actions of the out-camera 180. FIGS. 11, 16, and 17 each illustrate a flowchart showing an example of a series of actions taken to control the electronic apparatus 1A. These actions in FIGS. 11, 16, and 17 can be implemented by various functions of the controller 100 including the communication processor 111, the camera controller 112A, and the current state recognition unit 114A. The various functions can be implemented based on the execution of the control program Pg2 by the controller 100. That is to say, the control actions in FIGS. 11, 16, and 17 can be implemented based on the execution of the control program Pg2 by the controller 100.

The processing of Steps S1 and S2 is as described in one embodiment mentioned above. When the processing of Step S2 is ended, Step S11A of FIG. 16 is performed.

In Step S11A of FIG. 16, the controller 100 determines whether the submergence state exists as in Step S11 (see FIG. 12) mentioned above. If the submergence state is detected, Step S12A is performed. If no such submergence state is detected, Step S31A of FIG. 17 is performed.

In Step S12A, the camera controller 112A determines whether the in-camera 190 is currently capturing a video. If the in-camera 190 is currently capturing a video, Step S13A is performed. If the in-camera 190 is not currently capturing a video, Step S17A is performed.

In Step S13A, the controller 100 determines whether the front surface 1a faces downward. If the front surface 1a faces downward, Step S14A is performed. If the front surface 1a does not face downward, Step S15A is performed.

In Step S14A, the controller 100 determines whether the submergence state exists as in Step S11A mentioned above. If the submergence state is detected, Step S12A is performed again. If the submergence state has ceased, Step S23A is performed.

In Step S15A, the camera controller 112A causes the in-camera 190 to stop capturing a video.

In Step S16A, the camera controller 112A causes the out-camera 180 to start capturing a video as in Step S13 (see FIG. 12) mentioned above. In place of the first video 503 captured by the in-camera 190, the first video 503o captured by the out-camera 180 may be displayed on the video call screen.

In Step S17A, the controller 100 determines whether the submergence state exists as in Step S11 (see FIG. 12) mentioned above. If the submergence state is maintained, Step S18A is performed. If the submergence state has ceased, Step S21A is performed. When the submergence state is continuously detected, the controller 100 can recognize that the submergence state is maintained.

In Step S18A, the controller 100 determines whether the front surface 1a faces downward. If the front surface 1a does not face downward, Step S17A is performed again. If the front surface 1a faces downward, Step S19A is performed.

In Step S19A, the camera controller 112A causes the out-camera 180 to stop capturing a video.

In Step S20A, the camera controller 112A causes the in-camera 190 to start capturing a video. In place of the first video 503o captured by the out-camera 180, the first video 503 captured by the in-camera 190 may be displayed on the video call screen. When the processing of Step S20A is ended, Step S12A is performed again.

In Step S21A, the camera controller 112A causes the out-camera 180 to stop capturing a video.

In Step S22A, the camera controller 112A causes the in-camera 190 to start capturing a video. In place of the first video 503o captured by the out-camera 180, the first video 503 captured by the in-camera 190 may be displayed on the video call screen. That is, when being taken out of the water, the electronic apparatus 1A is placed back in the original state of performing a video call through the use of a video captured by the in-camera 190.

In Step S23A, the controller 100 determines whether a command to end the video call has been issued as in Step S17 (see FIG. 12) mentioned above. If no such command to end the video call has been issued, Step S11A is performed again. If the command end to the video call has been issued, Step S24A is performed.

In Step S24A, the communication processor 111 ends the video call, and then, Step S1 of FIG. 11 is performed again. When the video call is ended, the in-camera 190 stops capturing a video. In place of the video call screen, a standby screen may be displayed on the display screen 2a.

In Step S31A of FIG. 17, the controller 100 determines whether the proximity state exists. For example, the proximity detector 211 measures the physical quantity that varies according to the proximity of an object to the front surface 1a, thereby detecting the proximity state in which the object is in close proximity to the front surface 1a. If the proximity state exists, Step S34A is performed. If no such proximity state exists, Step S32A is performed.

In Step S32A, the controller 100 determines whether the low luminance state exists. For example, the third state recognition unit 114c may recognize the low luminance state in which the brightness of an image captured by the in-camera 190 is not high. Specifically, the third state recognition unit 114c computes an evaluation value associated with the brightness of an image captured by the in-camera 190. If the evaluation value is smaller than or equal to the predetermined value, the third state recognition unit 114c may recognize that the low luminance state exists. If the low luminance state exists, Step S34A may be performed. If no such low luminance state exists, Step S33A may be performed.

In Step S33A, the controller 100 determines whether the high-speed movement state exists. For example, the motion detector 221 measures the movement speed which is the physical quantity that varies according to the movement of the electronic apparatus 1A, thereby detecting the high-speed movement state in which the electronic apparatus 1A is moving at a speed greater than or equal to the predetermined reference speed. If the high-speed movement state is detected, Step S34A may be performed. If no such high-speed movement state is detected, Step S23A of FIG. 16 may be performed.

In Step S34A, the camera controller 112A causes the in-camera 190 to stop capturing a video.

In Step S35A, the camera controller 112A causes the out-camera 180 to start capturing a video. In place of the first video 503 captured by the in-camera 190, the first video 503o captured by the out-camera 180 may be displayed on the video call screen.

In Step S36A, the controller 100 determines whether the submergence state exists as in Step S11A (see FIG. 16). If the submergence state is detected, Step S12A of FIG. 16 may be performed. If no such submergence state is detected, Step S37A is performed.

In Step S37A, the controller 100 determines whether the proximity state exists as in Step S31A mentioned above. If the proximity state exists, Step S40A may be performed. If no such proximity state exists, Step S38A may be performed.

In Step S38A, the controller 100 determines whether the low luminance state exists as in Step S32A mentioned above. If the low luminance state exists, Step S40A may be performed. If no such low luminance state exists, Step S39A may be performed.

In Step S39A, the controller 100 determines whether the high-speed movement state exists as in Step S33A mentioned above. If the high-speed movement state is detected, Step S40A may be performed. If no such high-speed movement state is detected, Step S42 may be performed.

In Step S40A, the controller 100 determines whether a command to end the video call has been issued as in Step S23A (see FIG. 16). If no such command to end the video call has been issued, Step S36A is performed again. If the command to end the video call has been issued, Step S41A is performed.

In Step S41A, the communication processor 111 ends the video call as in Step S24A (see FIG. 16), and then, Step S1 of FIG. 11 is performed again. When the video call is ended, the in-camera 190 stops capturing a video. In place of the video call screen, the standby screen may be displayed on the display screen 2a.

In Step S42A, the camera controller 112A causes the out-camera 180 to stop capturing a video.

In Step S43A, the camera controller 112A causes the in-camera 190 to start capturing a video. In place of the first video 503o captured by the out-camera 180, the first video 503 captured by the in-camera 190 may be displayed on the video call screen. When the processing of Step S43A is ended, Step S11A of FIG. 16 is performed again.

When the electronic apparatus 1A is powered off, the controller 100 may stop executing the control program Pg2 and these example control actions may be ended accordingly.

As described above, in place of video shooting through the use of the in-camera 190, video shooting through the use of the out-camera 180 is started in the electronic apparatus 1A according to the first modification when the specific state other than the submergence state such as the proximity state, the low luminance state, or the high-speed movement state is detected. The electronic apparatus 1A can accordingly have enhanced operability in terms of video shooting through the use of a camera suitable for its current state. This can lead to improved control over video shooting through the use of a camera suitable for the current state of the electronic apparatus 1A.

2-2. Second Modification

When the submergence state or the like is detected during a voice call, video shooting may be started and switching between the cameras may be performed. When the submergence state is detected by the submergence detector 201 during a voice call between the electronic apparatus and the external communication apparatus through the communication processor 111, the camera controller 112 or 112A may cause the out-camera 180 to start capturing a video. This enables the user to readily shoot a video of the underwater view in the midst of a voice call.

Figure 18:
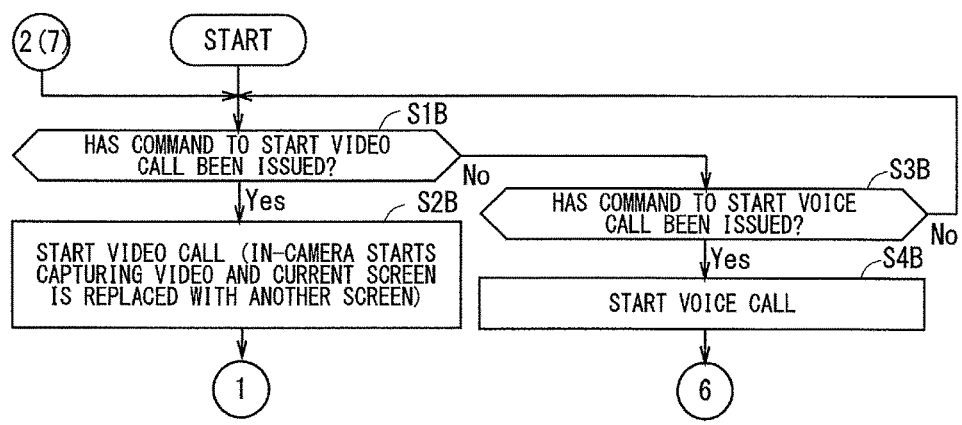
FIG. 18 illustrates a flowchart showing an example of a series of control actions.
Figure 19:
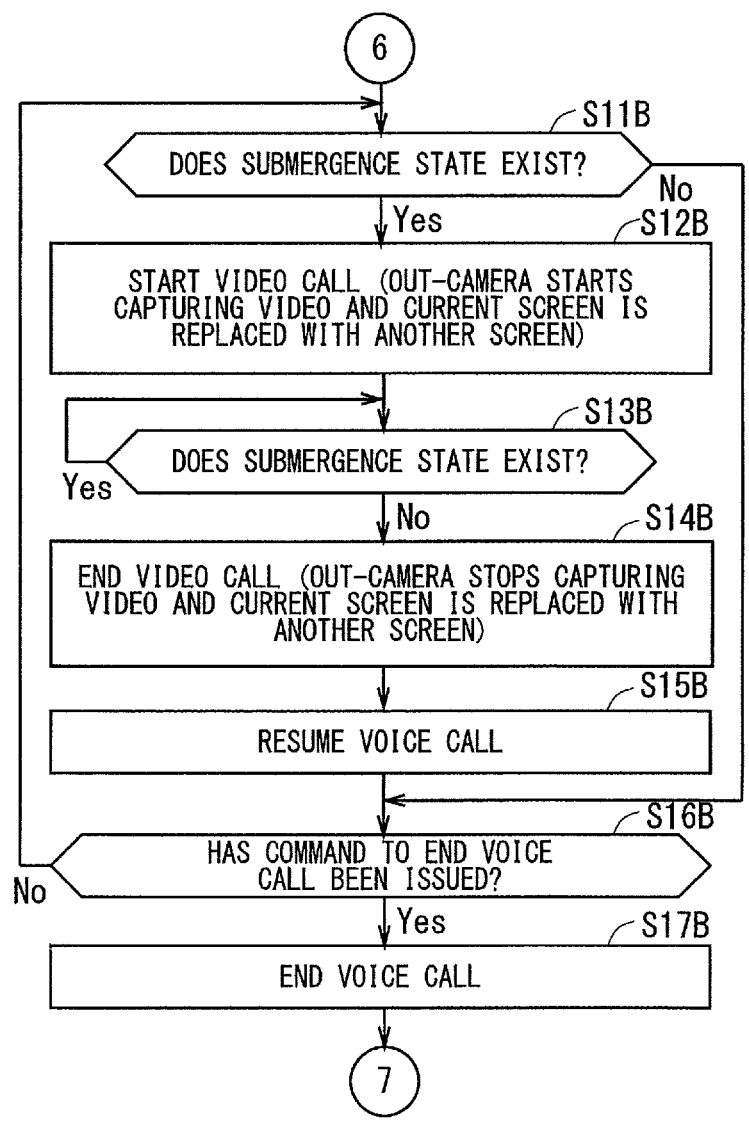
FIG. 19 illustrates a flowchart showing an example of a series of control actions.

The following will describe a series of actions taken to control the electronic apparatuses 1 and 1A, in other words, the actual implementation of a method for controlling the electronic apparatuses 1 and 1A in a manner to control video shooting actions of the out-camera 180. The flowchart illustrating an example of a series of actions taken to control the electronic apparatus 1 according to "1. One Embodiment" in the above description and the flowchart illustrating an example of a series of actions taken to control the electronic apparatus 1A according to "2-1. First Modification" in the above description may be changed in such a manner that a series of actions in FIG. 18 are performed in place of the above-mentioned actions in FIG. 11, and a series of actions in FIG. 19 are additionally performed. These actions in FIGS. 18 and 19 will now be described.

In Step S1B of FIG. 18, the communication processor 111 determines whether a command to start a video call has been issued as in Step S1 (see FIG. 11) mentioned above. If the command to start a video call has been issued, Step S2B is performed. If no such command to start a video call has been issued, Step S3B is performed.

In Step S2B, the communication processor 111 starts a video call as in Step S2 (see FIG. 11) mentioned above. At the same time, the in-camera 190 starts capturing a video and the screen displayed on the display screen 2a is replaced with another screen. For example, the input/output controller 113 may start displaying the video call screen on the display screen 2a. After the processing of Step S2B, Step S11 of FIG. 12 (or Step S11A of FIG. 16) is performed.

In Step S3B, the communication processor 111 determines whether a command to start a voice call has been issued. If the command to start a voice call has been issued, Step S4B is performed. If no such command to start a voice call has been issued, Step S1B is performed again.

In Step S4B, the communication processor 111 starts a voice call. At the same time, the voice call screen may appear on the display screen 2a. After the processing of Step S4B, Step S11B of FIG. 19 is performed.

In Step S11B of FIG. 19, the controller 100 determines whether the submergence state exists as in Step S11 (see FIG. 12) mentioned above. If the submergence state is detected, Step S12B may be performed. If no such submergence state is detected, Step S16B may be performed.

In Step S12B, the communication processor 111 starts a video call. At the same time, the out-camera 180 starts capturing a video and the screen displayed on the display screen 2a is replaced with another screen. For example, the input/output controller 113 may start displaying the video call screen on the display screen 2a.

In Step S13B, the controller 100 determines whether the submergence state exists as in Step S11B mentioned above. The controller 100 may repetitively make determination in Step S13B until the submergence state ceases. When the submergence state ceases, Step S14B may be performed.

In Step S14B, the communication processor 111 ends the video call. At the same time, the out-camera 180 stops capturing a video and the screen displayed on the display screen 2a is replaced with another screen. For example, the input/output controller 113 may replace the video call screen with the voice call screen on the display screen 2a.

In Step S15B, the communication processor 111 resumes the voice call.

In Step S16B, the controller 100 determines whether a command to end the voice call has been issued as in Step S17 (see FIG. 12) mentioned above. If no such command to end the voice call has been issued, Step S11B is performed again. If the command to end the voice call has been issued, Step S17B is performed.

In Step S17B, the communication processor 111 ends the voice call, and then, Step S1B of FIG. 18 is performed again.

When each of the electronic apparatuses 1 and 1A is powered off, the controller 100 may stop executing the corresponding one of the control programs Pg1 and Pg2 and theses example control actions may be ended accordingly.

The out-camera 180 starts capturing a video in the midst of a voice call and this video is used for a video call in the above description, which is not limited thereto. The video may be stored in the storage 103 and various memories. Alternatively, the video may be transmitted to the calling party device without being displayed on the display screen 2a. Still alternatively, in the case where the out-camera 180 has started capturing a video in the midst of a voice call, the display screen 2a may be placed in the non-display state in which no information is output during the video shooting through the use of the out-camera 180. Examples of the various memories may include a memory of a server communicably connected to the electronic apparatus 1 or 1A or may include one or more memories in a cloud computing environment.

2-3. Third Modification

When the submergence state is detected, the out-camera 180 may start capturing a video, regardless of whether a voice call is currently performed.

Figure 20:
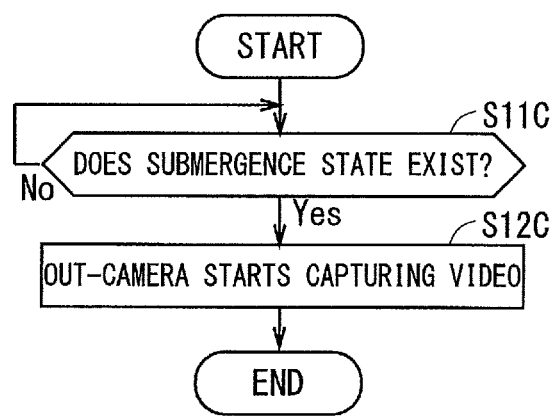
FIG. 20 illustrates a flowchart showing an example of a series of control actions.

A series of actions in FIG. 20 taken to control the electronic apparatus 1 or 1A may be performed. These control actions can be implemented based on the execution, by the controller 100, of the control program stored in the storage 103.

In Step S11C of FIG. 20, the controller 100 determines whether the submergence state exists as in, for example, Step S11B (see FIG. 19) mentioned above. The controller 100 may repetitively make determination in Step S11C until the submergence state is detected. If the submergence state is detected, Step S12C may be performed.

If the submergence state is detected by the submergence detector 201 in Step S11C, in Step S12C, the camera controller 112 or 112A causes the out-camera 180 to start capturing a video. The video shooting actions of the out-camera 180 may be controlled in this manner, whereby the electronic apparatuses 1 or 1A can accordingly have enhanced operability in terms of video shooting through the use of a camera suitable for its current state. This can lead to improved control over video shooting through the use of a camera suitable for the current state of the electronic apparatus 1 or 1A.

The video captured by the out-camera 180 may be used for a video call, may be stored in the storage 103 and various memories, or may be transmitted to the calling party device without being displayed on the display screen 2a. Alternatively, the display screen 2a may be placed in the non-display state in which no information is output during the video shooting through the use of the out-camera 180.

2-4. Fourth Modification

The image captured by the out-camera 180 may be merely transmitted to the calling party device or an external apparatus such as a server. At the same time, the input/output controller 113 may display, on the display screen 2a, a notification that the image is now being sent.

An example of the display screen 2a on which such a notification is displayed is as shown in FIG. 10. In the illustration of FIG. 10, an element TM1 indicating that an image is now being sent is displayed on the status bar STB1. In addition, the illustration of FIG. 10 also shows a pop-up including text which is another element indicating that an image is now being sent. Although the notification that the image is being transmitted is indicated by the visible element on the display screen 2a, such a notification may be provided by voice or various types of lighting. The screen display, voice, or lighting may be used alone or in combination to provide such a notification. When it is notified that an image is being transmitted, the user can readily recognize that an image captured by the out-camera 180 is being transmitted.

Figure 21:
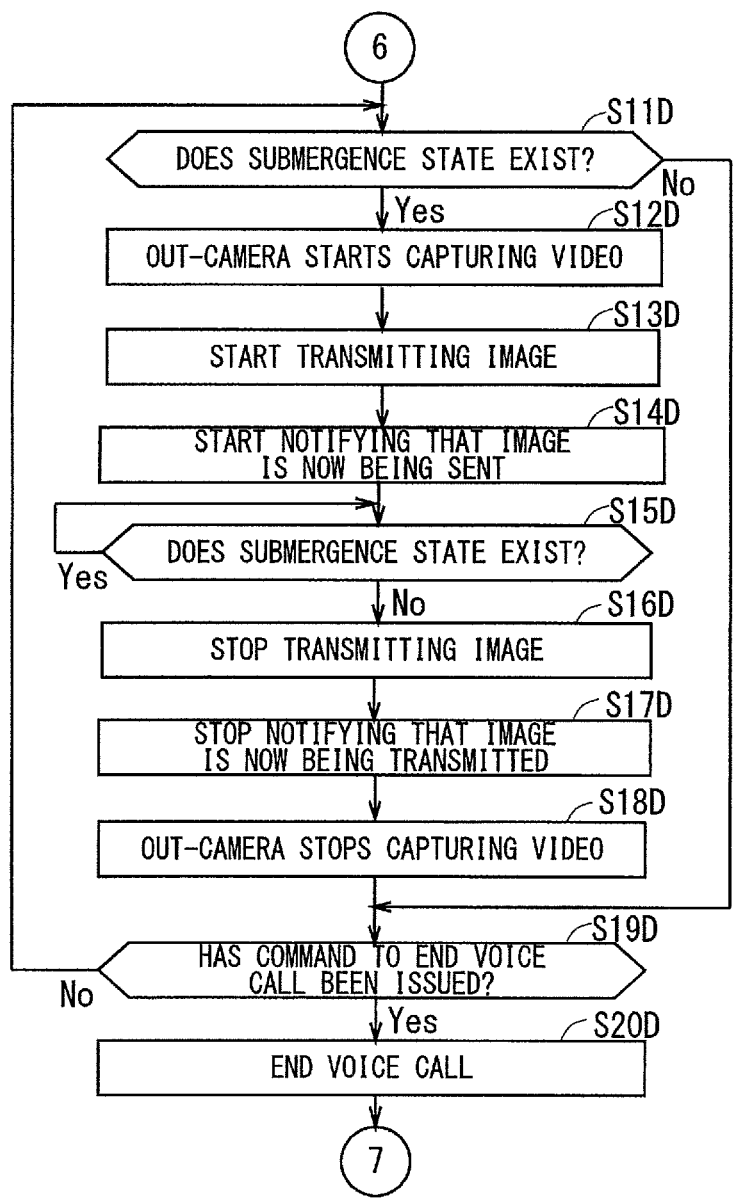
FIG. 21 illustrates a flowchart showing an example of a series of control actions.

In such a modification, a series of actions in FIG. 21 taken to control the electronic apparatus 1 or 1A may be performed in place of the control actions in FIG. 19. The control actions in FIG. 21 can be implemented based on the execution, by the controller 100, of the control program stored in the storage 103.

In Step S11D of FIG. 21, the controller 100 determines whether the submergence state exists as in Step S11B (see FIG. 19) mentioned above. If the submergence state is detected, Step S12D may be performed. If no such submergence state is detected, Step S19D may be performed.

In Step S12D, the camera controller 112 or 112A causes the out-camera 180 to start capturing a video.

In Step S13D, the communication processor 111 starts transmitting an image captured by the out-camera 180. The destination of the image may be the calling party device or an external apparatus such as a server.

In Step S14D, the input/output controller 113 starts notifying that the image captured by the out-camera 180 is being transmitted. As illustrated in FIG. 10, the display screen may show both the element TM1 indicating that an image is now being sent and the text which is another element indicating that an image is now being sent.

In Step S15D, the controller 100 determines whether the submergence state exists as in Step S13B (see FIG. 19) mentioned above. The controller 100 may repetitively make determination in Step S15D until the submergence state ceases. When the submergence state ceases, Step S16D may be performed.

In Step S16D, the communication processor 111 stops transmitting the image.

In Step S17D, the input/output controller 113 stops notifying that the image captured by the out-camera 180 is now been transmitted.

In Step S18D, the camera controller 112 or 112A causes the out-camera 180 to stop capturing a video.

In Step S19D, the controller 100 determines whether a command to end the voice call has been issued as in Step S17 (see FIG. 12) mentioned above. If no such command to end the voice call has been issued, Step S11D is performed again. If the command to end the voice call has been issued, Step S20D is performed.

In Step S20D, the communication processor 111 ends the voice call, and then, Step S1B of FIG. 18 is performed again.

When the electronic apparatus 1 or 1A is powered off, the controller 100 may stop executing the control program Pg1 or Pg2 and these example control actions may be ended accordingly.

2-5. Fifth Modification

When the submergence state is detected in the state in which an external device including a camera unit is communicably connected with the electronic apparatus 1 or 1A, the camera unit of the external device may start capturing a video.

2-5-1. External Appearance of Electronic Apparatus System

Figure 22:
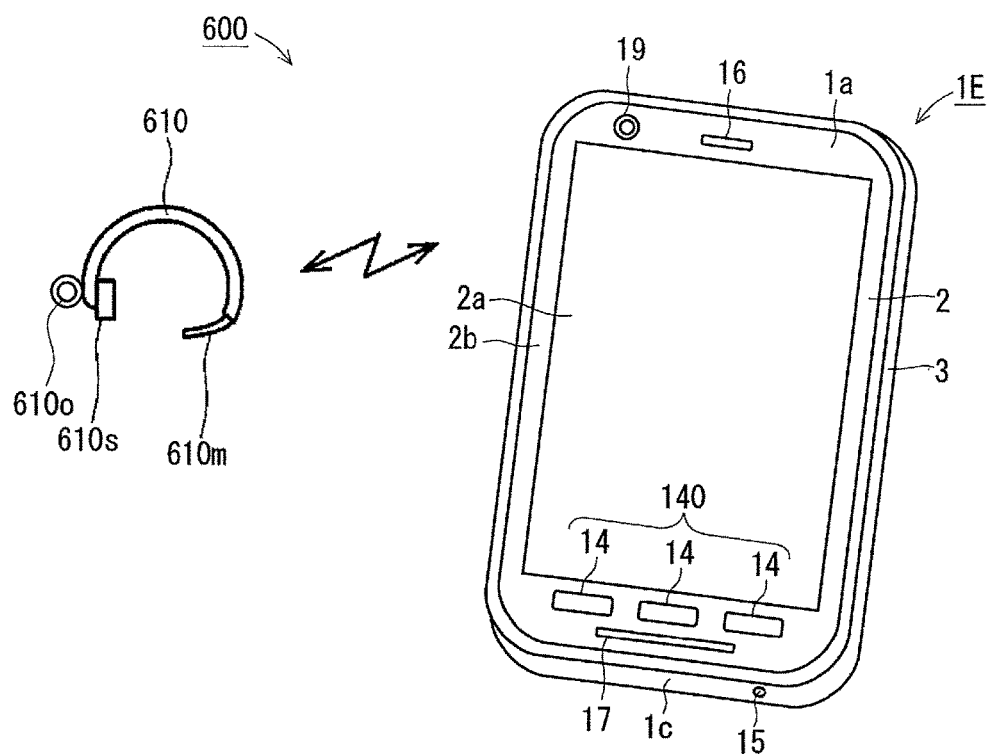
FIG. 22 illustrates a schematic perspective view of an example of an external appearance of an electronic apparatus system.

FIG. 22 illustrates a schematic perspective view of an example of an external appearance of an electronic apparatus system 600 according to a fifth modification. As illustrated in FIG. 22, the electronic apparatus system 600 includes an electronic apparatus 1E and an external device 610.

Figure 23:
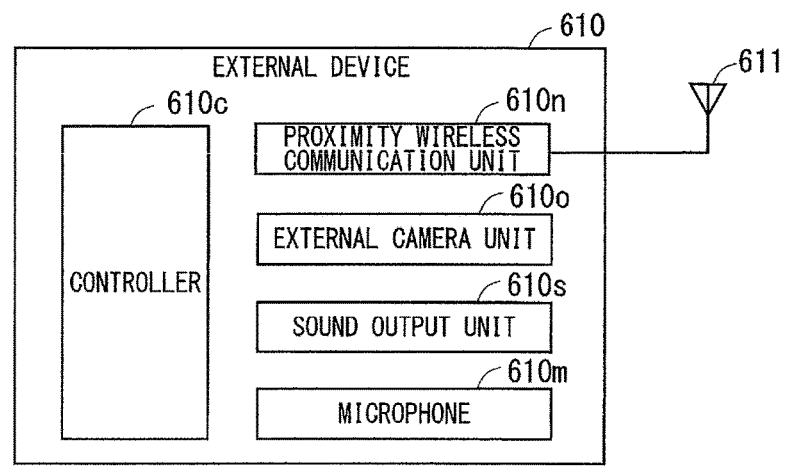
FIG. 23 illustrates an example of an electrical configuration of an external device.

FIG. 23 illustrates an example of an electrical configuration of the external device 610 according to the fifth modification. The external device 610 includes a proximity wireless communication unit 610n, a camera unit 610o (also referred to as an "external camera unit 610o"), a sound output unit 610s, a microphone unit 610m, and a controller 610c. The external device 610 may be a headset to be worn on the user's head. Another example of the external device 610 may be a portable digital camera.

The controller 610c can perform overall control of the external device 610. The proximity wireless communication unit 610n can be connected to the electronic apparatus 1E in a manner to transmit and receive date to and from the electronic apparatus 1E. The proximity wireless communication unit 610n includes an antenna 611 so as to wirelessly communicate with the electronic apparatus 1E. The method of communication may be close proximity wireless communication in which communication can be established between devices located within a short distance. The proximity wireless communication unit 610n can, for example, receive a sound signal from the electronic apparatus 1E. The sound output unit 610s can output a sound corresponding to the sound signal. The sound output unit 610s may be a speaker such as an earphone. The external camera unit 610o includes a lens and an image sensor. The external camera unit 610o can image an object under the control of the controller 610c, whereby an image can be obtained. The external device 610 can output the obtained image to the electronic apparatus 1E through the proximity wireless communication unit 610n. The microphone unit 610m can convert a voice of the user into a sound signal. The external device 610 can output the sound signal to the electronic apparatus 1E through the proximity wireless communication unit 610n. This configuration enables the user to capture an image and to perform a voice call using the external device 610.

FIG. 24 illustrates an example of an electrical configuration of the electronic apparatus 1E according to the fifth modification. The electronic apparatus 1E includes a control program Pg3 in place of the control program Pg1 and also includes a proximity wireless communication unit 270 in addition to other constituent components of the electronic apparatus 1 according to one embodiment mentioned above. The proximity wireless communication unit 270 can conduct, through an antenna 270a, communication with a communication terminal that is closer to the electronic apparatus 1E than the communication target of the wireless communication unit 110 (e.g., a base station) is. For example, the proximity wireless communication unit 270 can wirelessly communicate with the external device 610 through the antenna 270a. The proximity wireless communication unit 270 can conduct communication according to the Bluetooth (registered trademark) standard. The proximity wireless communication unit 270 may communicate with the external device 610 according to another proximity wireless communication standard such as the digital enhanced cordless telecommunications (DECT) standard, the association of radio industries and businesses standard T101 (ARIB STD-T101), the dedicated short range communications (DSRC) standard, the I-Beacon standard, the infrared data association (IrDA) standard, the near field communication (NFC) standard, the TransferJet standard, the WiMedia Alliance standard, the ZigBee standard, the Z-Wave standard, or the Wi-Fi standard. The electronic apparatus 1E may perform switching among some of these standards or may use some of these standard in combination to communicate with the external device 610.

The external device 610 and the electronic apparatus 1E can wirelessly communicate with each other. Unlike wired communication, a voice call performed through the use of the external device 610 permits free use of the space between the external device 610 and the electronic apparatus 1E.

The external device 610 may include a notification unit. In this case, the communication processor 111 may send a notice of an incoming call to the external device 610, and then, the notification unit of the external device 610 may notify the user of the incoming call.

2-5-2. Example Configuration of Controller

Figure 25:
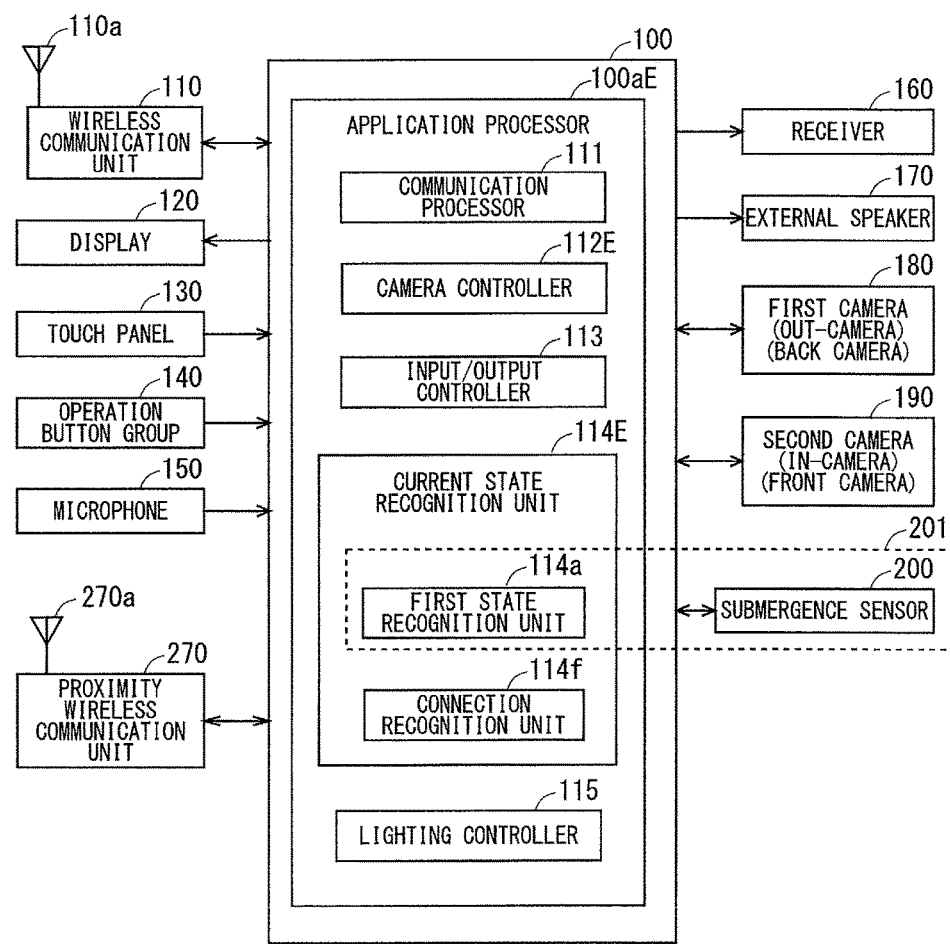
FIG. 25 schematically illustrates an example of the internal configuration of the controller.

FIG. 25 illustrates a functional block diagram schematically showing an example configuration of the controller 100 according to the fifth modification. Unlike the controller 100 according to one embodiment mentioned above, the controller 100 according to the fifth modification additionally has the function of detecting the state in which the external device 610 is connected to the electronic apparatus 1E and the function of controlling actions of the external camera unit 610o.

Specifically, the controller 100 according to the fifth modification includes an application processor 100aE, which serves as an extension of the application processor 100a according to one embodiment mentioned above, substitutes a camera controller 112E and a current state recognition unit 114E for the camera controller 112 and the current state recognition unit 114. The current state recognition unit 114E, which serves as an extension of the current state recognition unit 114, further includes a connection recognition unit 114f. The application processor 100aE of the controller 100 can read the control program Pg3 from the storage 103 and execute the control program Pg3, whereby the functional configuration of the controller 100 can be changed as described above.

The connection recognition unit 114f can recognize the state in which the external device 610 is communicably connected to the electronic apparatus 1E. This state is referred to as a "connection state". The connection recognition unit 114f can recognize the connection state with reference to, for example, information on a communication terminal which is communicably connected to the electronic apparatus 1E through the proximity wireless communication unit 270.

When the submergence state is detected by the submergence detector 201 and the connection state is recognized by the connection recognition unit 114f, the camera controller 112E may cause the external camera unit 610o to start capturing a video. When the submergence state is detected by the submergence detector 201 and no such connection state is recognized by the connection recognition unit 114f, the camera controller 112E can cause the out-camera 180 to start capturing a video.

The fifth modification prioritizes the cameras for use in the submergence state. These are, in descending order of priority: the external camera unit 610o; the out-camera 180; and the in-camera 190. These cameras may be prioritized according to the control program Pg3 executed by the controller 100. The electronic apparatus 1E having such a configuration can accordingly have enhanced operability in terms of video shooting through the use of a camera suitable for its current state. This can lead to improved control over video shooting though the use of a camera suitable for the current state of the electronic apparatus 1E. Specifically, with the external device 610, namely, a headset on his/her head, the user can readily use the electronic apparatus 1E to talk about the underwater view in real time while staying immediately below the water surface.

The screen displayed on the display 120 may show a predetermined element corresponding to the connection state in which the external device 610 is communicably connected to the electronic apparatus 1E.

Figure 26:
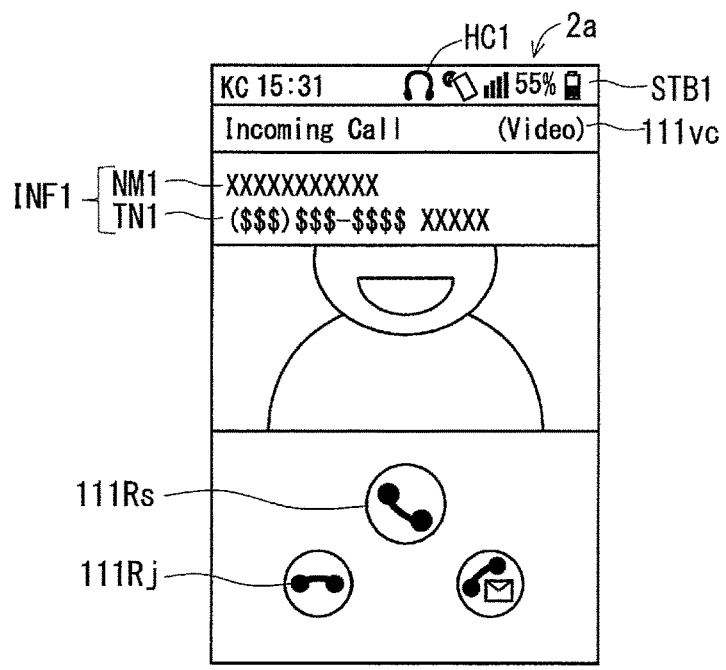
FIG. 26 illustrates example display contents of the display screen associated with an incoming call.
Figure 27:
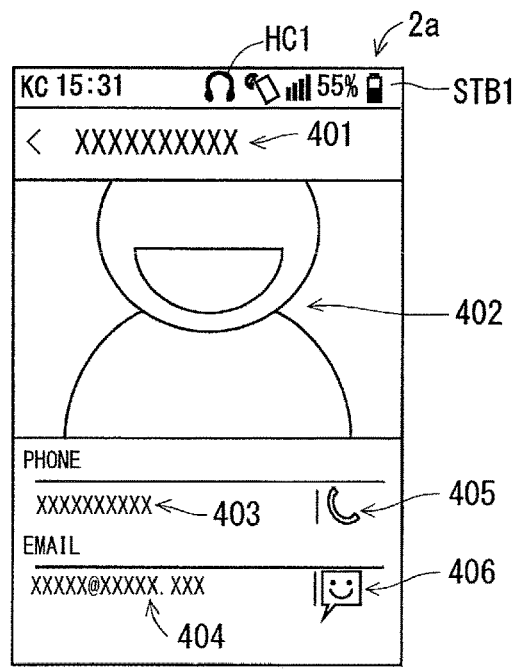
FIG. 27 illustrates example display contents of the display screen associated with an outgoing call.
Figure 28:
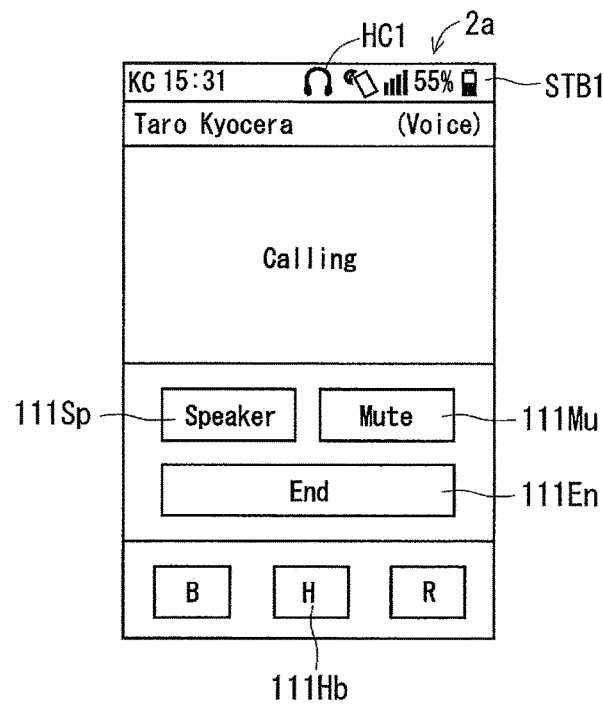
FIG. 28 illustrates example display contents of the display screen associated with a voice call.
Figure 29:
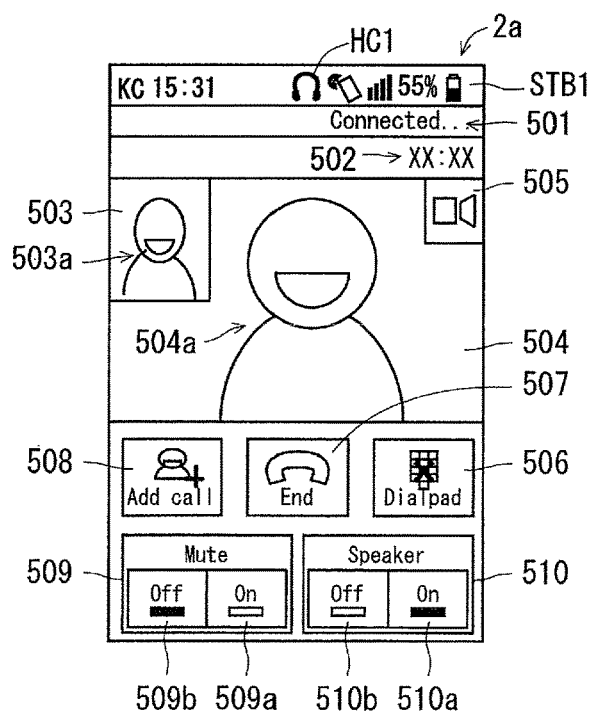
FIG. 29 illustrates example display contents of the display screen associated with a video call.
Figure 30:
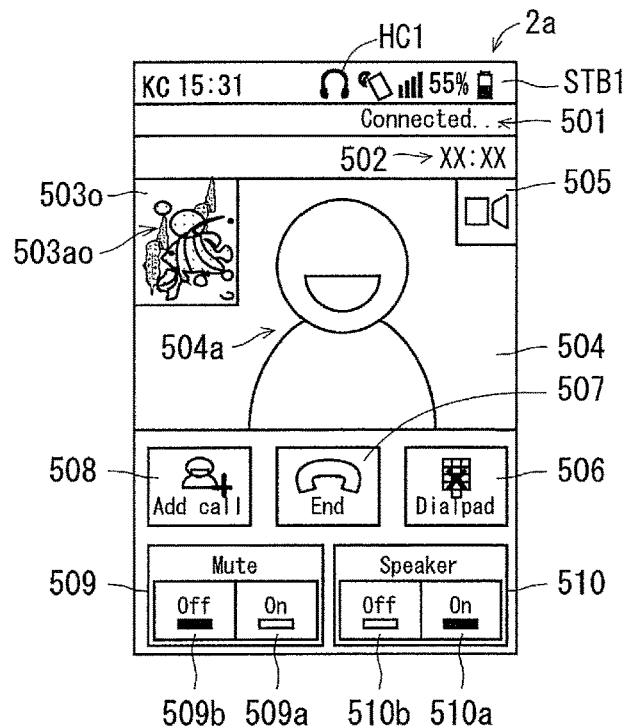
FIG. 30 illustrates example display contents of the display screen associated with a video call.
Figure 31:
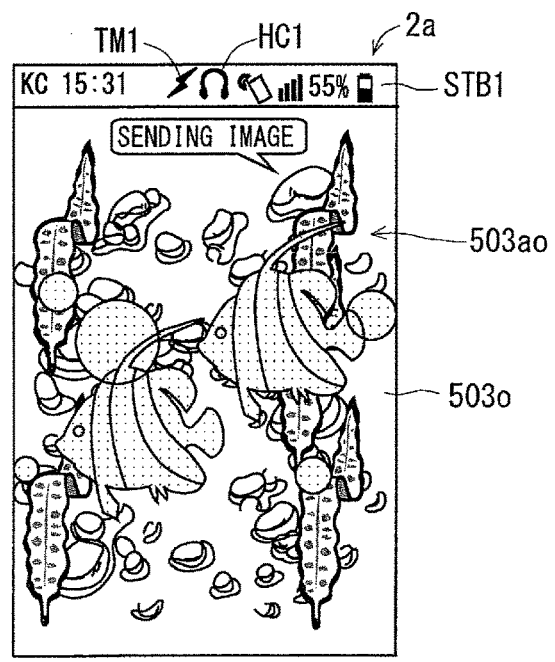
FIG. 31 illustrates example display contents of the display screen associated with a video call.

FIG. 26 illustrates an example of the incoming call screen showing the predetermined element. FIG. 27 illustrates an example of the personal information screen showing the predetermined element. FIG. 28 illustrates an example of the voice call screen showing the predetermined element. FIGS. 29 to 31 illustrate examples of the video call screen showing the predetermined element. Specifically, when the external device 610 is communicably connected to the electronic apparatus 1E, an icon HC1 indicating this connection state may be displayed on the status bar STB1 as illustrated in FIGS. 26 to 31. The icon HC1 can be displayed by the input/output controller 113 or through the use of other functions.

2-5-3. Example of a Series of Actions Taken to Control Electronic Apparatus

The following will describe a series of actions taken to control the electronic apparatus 1E, in other words, the actual implementation of a method for controlling the electronic apparatus 1E in a manner to control video shooting actions of the external camera unit 610o and the out-camera 180.

Each of a combination of FIG. 11 and FIGS. 32 to 35 and a combination of FIG. 18, FIG. 19, and FIGS. 32 to 35 illustrate a flowchart showing an example of a series of actions taken to control the electronic apparatus 1E. The control actions in the combination of FIG. 11 and FIGS. 32 to 35 and the control actions in the combination of FIG. 18, FIG. 19, and FIGS. 32 to 35 can be implemented by various functions of the controller 100 including the communication processor 111, the camera controller 112E, and the current state recognition unit 114E. The various functions can be implemented based on the execution of the control program Pg3 by the controller 100. That is to say, the control actions in the combination of FIG. 11 and FIGS. 32 to 35 and the control actions in the combination of FIG. 18, FIG. 19, and FIGS. 32 to 35 can be implemented based on the execution of the control program Pg3 by the controller 100.

Figure 32:
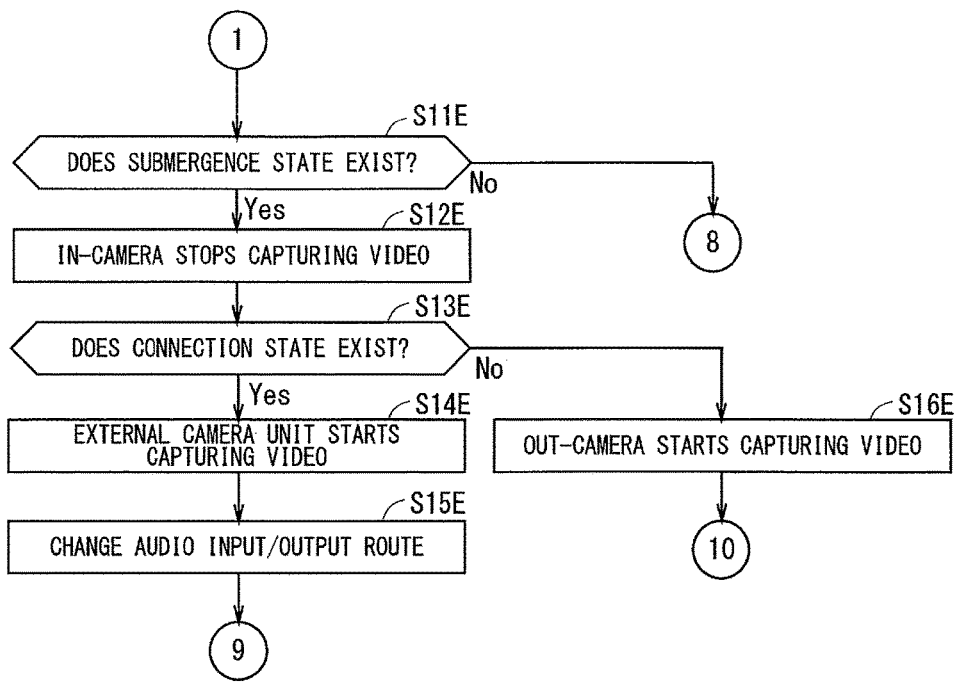
FIG. 32 illustrates a flowchart showing an example of a series of control actions.

In the case where the actions in FIG. 11 are taken, the processing of Steps S1 and S2 of FIG. 11 is performed as described in one embodiment mentioned above. When the processing of Step S2 is ended, Step S11E of FIG. 32 is performed. In the case where the actions in FIGS. 18 and 19 are taken, meanwhile, the processing of Steps S1B to S4B of FIG. 18 is performed as described in the second modification mentioned above. When the processing of Step S2B is ended, Step S11E of FIG. 32 is performed.

In Step S11E of FIG. 32, the controller 100 determines whether the submergence state exist as in Step S11B (see FIG. 19). If the submergence state is detected, Step S12E may be performed. If no such submergence state is detected, Step S42E of FIG. 35 may be performed.

In Step S12E, the camera controller 112E causes the in-camera 190 to stop capturing a video.

In Step S13E, the controller 100 determines whether the connection state exist. For example, the connection recognition unit 114f may recognize the connection state in which the external device 610 is communicably connected to the electronic apparatus 1E. If the connection state is recognized, Step S14E may be performed. If no such connection state is recognized, Step S16E may be performed.

In Step S14E, the camera controller 112E causes the external camera unit 610o to start capturing a video. That is to say, when the submergence state is detected by the submergence detector 201 and the connection state is recognized by the connection recognition unit 114f, the external camera unit 610o starts capturing a video. At the same time, the video captured by the in-camera 190 may be readily replaced with the video captured by the external camera unit 610o for use in the video call. For example, the first video 503 captured by the in-camera 190 may be replaced with the first video captured by the external camera unit 610o on the video call screen.

In Step S15E, the input/output controller 113 changes the audio input/output route. The audio input/output route may be changed from the route passing through the microphone 150 and the external speaker 170 of the electronic apparatus 1E to the route passing through the microphone unit 610m and the sound output unit 610s of the external device 610. In general, a voice call performed in a video call involves the audio input/output through the use of the speakerphone function. However, this audio input/output through the use of the speakerphone function cannot be easily performed when the electronic apparatus 1E is located underwater. In this case, the audio input/output through the use of the external device 610, namely, a headset enables the user to readily perform a voice call. When the processing of Step S15E is ended, Step S21E of FIG. 33 is performed.

Figure 34:
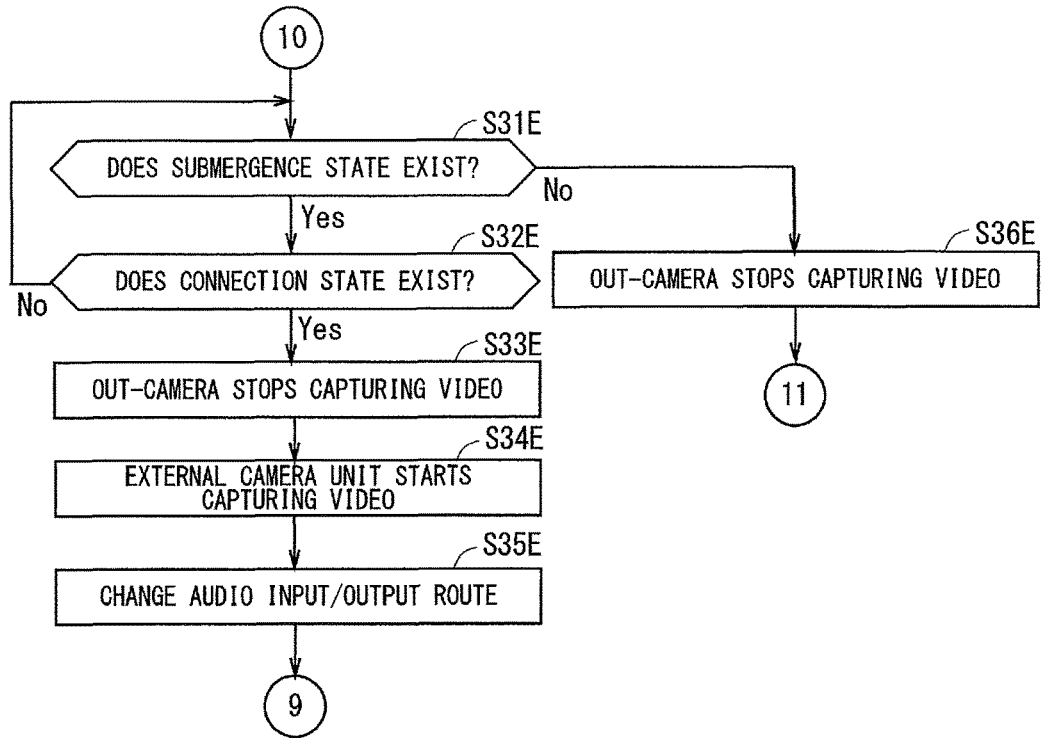
FIG. 34 illustrates a flowchart showing an example of a series of control actions.

In Step S16E, the camera controller 112E causes the out-camera 180 to start capturing a video. When the processing of Step S16E is ended, Step S31E of FIG. 34 is performed.

Figure 33:
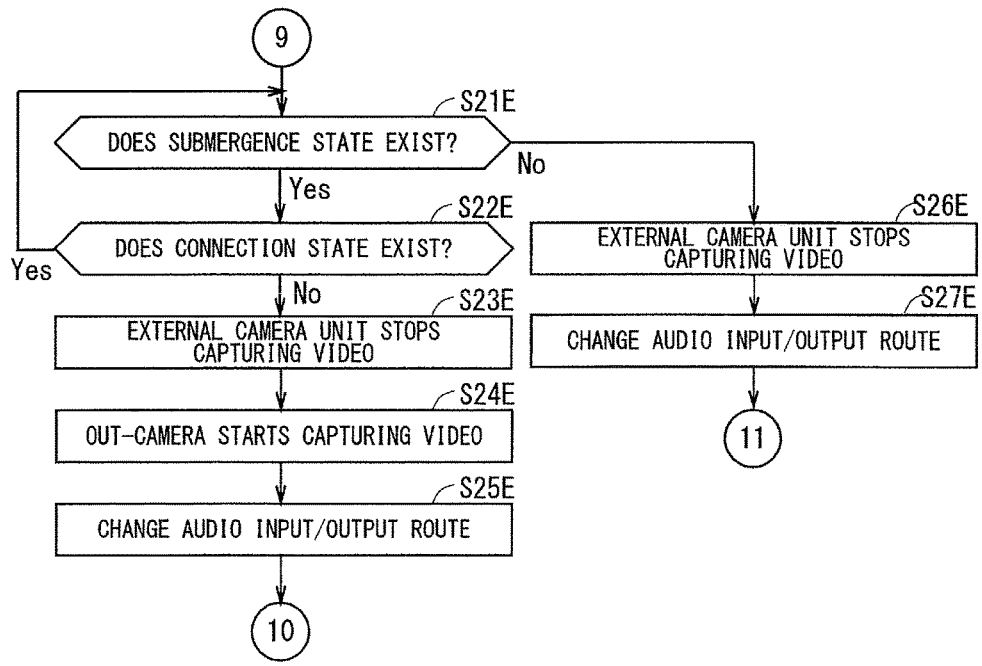
FIG. 33 illustrates a flowchart showing an example of a series of control actions.

In Step S21E of FIG. 33, the controller 100 determines whether the submergence state exists as in Step S11E (see FIG. 32) mentioned above. If the submergence state is detected, Step S22E may be performed. If no such submergence state is detected, Step S26E may be performed.

In Step S22E, the controller 100 determines whether the connection state exists as in Step S13E (see FIG. 32) mentioned above. If the connection state has not ceased yet, Step S21E may be performed again. If the connection state has ceased, Step S23E may be performed.

In Step S23E, the camera controller 112E causes the external camera unit 610o to stop capturing a video.

In Step S24E, the camera controller 112E causes the out-camera 180 to start capturing a video. The camera for use in the submergence state is selected according to the predetermined priority order. When the external device 610 including the external camera unit 610o which is the highest priority camera is not connected to the electronic apparatus 1E, the out-camera 180 which is the second-highest priority camera starts capturing a video.

In Step S25E, the input/output controller 113 changes the audio input/output route. The audio input/output route may be changed from the route passing through the microphone unit 610m and the sound output unit 610s of the external device 610 to the route passing through the microphone 150 and the external speaker 170 of the electronic apparatus 1E. When the processing of Step S25E is ended, Step S31E of FIG. 34 is performed.

In Step S26E, the camera controller 112E causes the external camera unit 610o to stop capturing a video.

Figure 35:
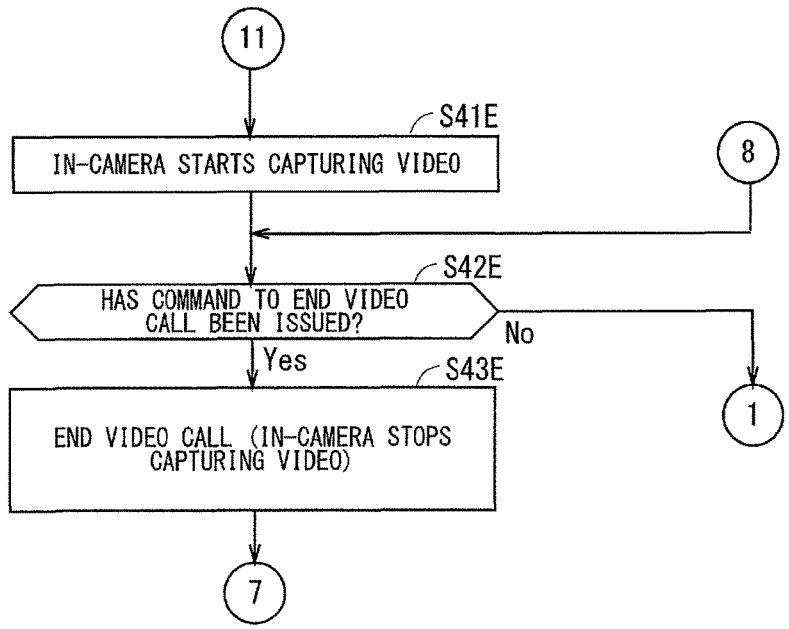
FIG. 35 illustrates a flowchart showing an example of a series of control actions.

In Step S27E, the input/output controller 113 changes the audio input/output route. The audio input/output route may be changed from the route passing through the microphone unit 610m and the sound output unit 610s of the external device 610 to the route passing through the microphone 150 and the external speaker 170 of the electronic apparatus 1E. When the processing of Step S27E is ended, Step S41E of FIG. 35 is performed.

In Step S31E of FIG. 34, the controller 100 determines whether the submergence state exists as in Step S11E (see FIG. 32) mentioned above. If the submergence state is detected, Step S32E may be performed. If no such submergence state is detected, Step S36E may be performed.

In Step S32E, the controller 100 determines whether the connection state exists as in Step S13E (see FIG. 32) mentioned above. If the connection state is recognized, Step S33E may be performed. If no such connection state is recognized, Step S31E may be performed again.

In Step S33E, the camera controller 112E causes the out-camera 180 to stop capturing a video.

In Step S34E, the camera controller 112E causes the external camera unit 610o to start capturing a video. The camera for use in the submergence state is selected according to the predetermined priority order. Here, the external device 610 including the external camera unit 610o which is the highest priority camera is connected. Thus, the out-camera 180 stops capturing a video and then the external camera unit 610o starts capturing a video.

In Step S35E, the input/output controller 113 changes the audio input/output route. The audio input/output route may be changed from the route passing through the microphone 150 and the external speaker 170 of the electronic apparatus 1E to the route passing through the microphone unit 610m and the sound output unit 610s of the external device 610. When the processing of Step S35E is ended, Step S21E of FIG. 33 is performed.

In Step S36E, the camera controller 112E causes the out-camera 180 to stop capturing a video. When the processing of Step S36E is ended, Step S41E of FIG. 35 is performed.

In Step S41E, the camera controller 112E causes the in-camera 190 to start capturing a video. The electronic apparatus 1E is accordingly placed back in the normal video call state.

In Step S42E, the controller 100 determines whether a command to end the video call has been issued as in Step S17 (see FIG. 12) mentioned above. If no such command to end the video call has been issued, Step S11E (see FIG. 32) may be performed again. If the command to end the video call has been issued, Step S43E may be performed.

In Step S43E, the communication processor 111 ends the video call, and then, Step S1 of FIG. 11 (or Step S1B of FIG. 18) is performed again.

When the electronic apparatus 1E is powered off, the controller 100 may stop executing the control program Pg3 and these example control actions may be ended accordingly.

The out-camera 180 may be assigned the highest priority. In this case, the out-camera 180 may capture a video and the audio input/output route may be set to the route passing through the microphone unit 610m and the sound output unit 610s of the external device 610. The user can readily talk about the video captured by the out-camera 180 in real time.

2-6. Sixth Modification

Figure 36:
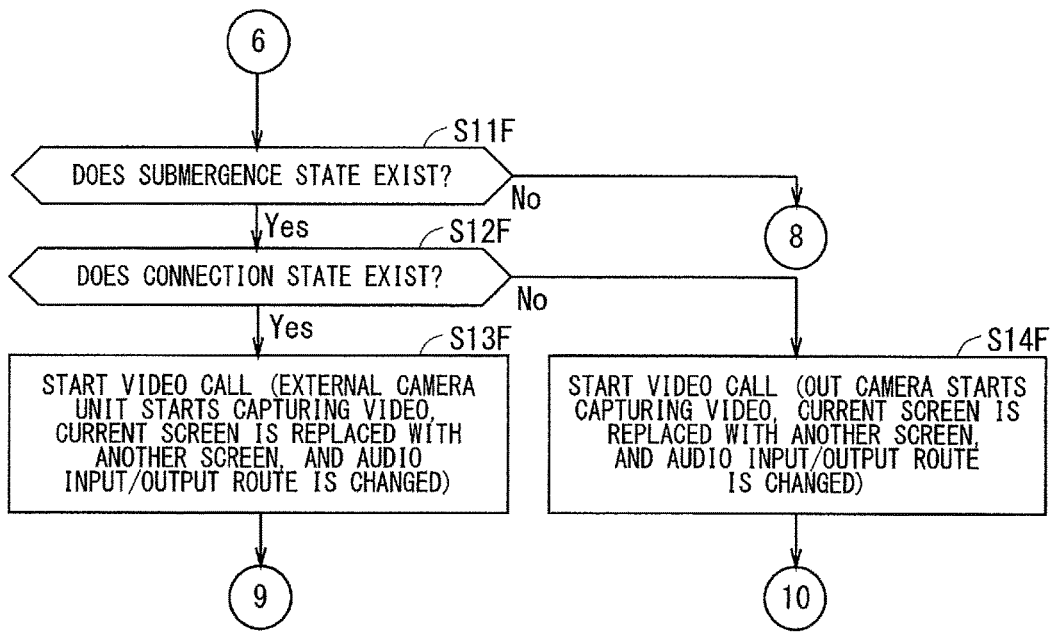
FIG. 36 illustrates a flowchart showing an example of a series of control actions.

When the submergence state is detected during a voice call in the state in which the external device 610 is communicably connected to the electronic apparatus 1E, the external camera unit 610o may start capturing a video. The series of example actions in FIGS. 19 and 35 may be replaced with a series of example actions in FIGS. 36 and 37. The series of example actions in FIGS. 36 and 37 will now be described.

In Step S11F of FIG. 16, the controller 100 determines whether the submergence state exists as in Step S11B (see FIG. 19) mentioned above. If the submergence state is detected, Step S12F may be performed. If no such submergence state is detected, Step S43F of FIG. 37 may be performed.

In Step S12F, the controller 100 determines whether the connection state exists as in Step S13E (see FIG. 32) mentioned above. If the connection state is recognized, Step S13F may be performed. If no such connection state is recognized, Step S14F may be performed.

In Step S13F, the communication processor 111 starts a video call. At the same time, the camera controller 112E causes the external camera unit 610o to start capturing a video and the input/output controller 113 changes both the screen displayed on the display screen 2a and the audio input/output route. For example, the input/output controller 113 may start displaying the video call screen on the display screen 2a. The input/output controller 113 also changes the audio input/output route from the route passing through the microphone 150 and the external speaker 170 of the electronic apparatus 1E to the route passing through the microphone unit 610m and the sound output unit 610s of the external device 610. When the processing of S13F is ended, Step S21E of FIG. 33 is performed.

When performing a voice call, the user supposedly sets the electronic apparatus 1E to the ear. Then, when the user submerges the electronic apparatus 1E in water to talk about the underwater view, the user can perform a video call using both a video captured by the out-camera 180 and the audio input/output through the external device 610, namely, a headset.

In Step S14F, the communication processor 111 starts a video call. At the same time, the camera controller 112E causes the out-camera 180 to start capturing a video, and the input/output controller 113 changes both the screen displayed on the display screen 2a and the audio input/output route. For example, the input/output controller 113 can start displaying the video call screen on the display screen 2a. The input/output controller 113 can also change the audio input/output route from the route passing through the microphone 150 and the receiver 160 of the electronic apparatus 1E to the route passing through the microphone 150 and the external speaker 170 of the electronic apparatus 1E. When the processing of Step S14F is ended, Step S31E of FIG. 34 is performed.

The external camera unit 610o or the out-camera 180 starts capturing a video in the midst of a voice call and the video is used for a video call in the above description, which is not limited thereto. The video may be stored in the storage 103 and various memories. Alternatively, the video may be transmitted to the calling party device without being displayed on the display screen 2a. Still alternatively, in the case where the out-camera 180 has started capturing a video in the midst of a voice call, the display screen 2a may be placed in the non-display state in which no information is output during the video shooting through the use of the out-camera 180. Examples of the various memories may include a memory of a server or may include one or more memories in a cloud computing environment.

Figure 37:
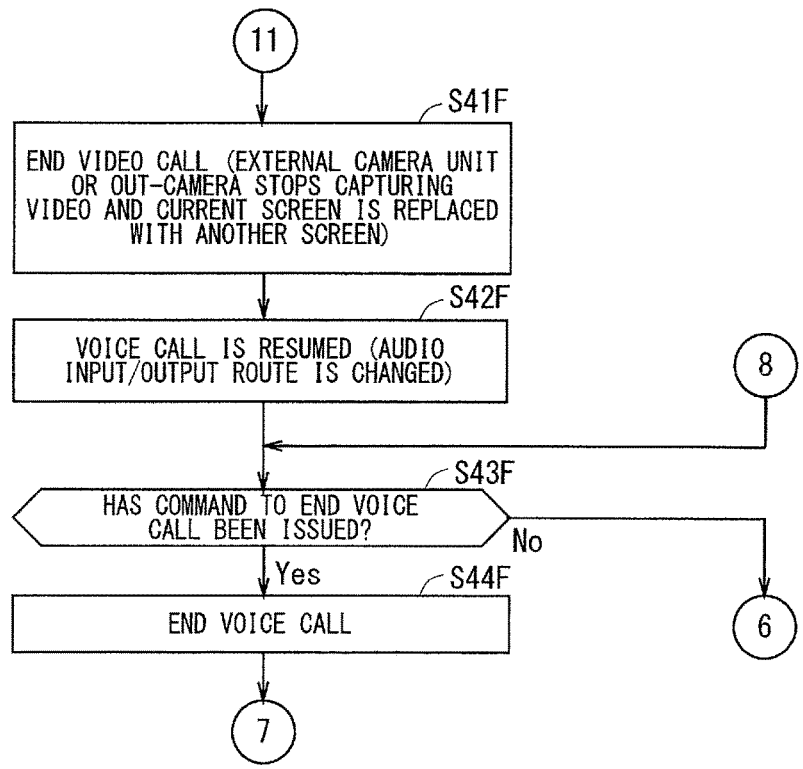
FIG. 37 illustrates a flowchart showing an example of a series of control actions.

In Step S41F of FIG. 37, the communication processor 111 ends the video call. At the same time, the input/output controller 113 may replace the video call screen with the voice call screen on the display screen 2a.

In Step S42F, the communication processor 111 resumes the voice call. The input/output controller 113 may set the audio input/output route to the route passing through the microphone 150 and the receiver 160 of the electronic apparatus 1E or keep this route available.

In Step S43F, the controller 100 determines whether a command to end the voice call has been issued as in Step S16B (see FIG. 19) mentioned above. If no such command to end the video call has been issued, Step S11F of FIG. 36 is performed again. If the command to end the video call has been issued, Step S44F may be performed.

In Step S44F, the communication processor 111 ends the voice call, and then, Step S1 of FIG. 11 (or Step S1B of FIG. 18) is performed again.

When the electronic apparatus 1E is powered off, the controller 100 may stop executing the control program Pg3 and these example control actions may be ended accordingly.

2-7. Seventh Modification

When the submergence state is detected in the state in which the front surface 1a faces downward, the in-camera 190 may start capturing a video, regardless of whether the video call is currently performed through the use of the in-camera 190. In this case, a series of control actions in FIG. 38 for controlling the electronic apparatus may be performed. The control actions can be implemented based on the execution, by the controller 100, of the control program stored in the storage 103.

Figure 38:
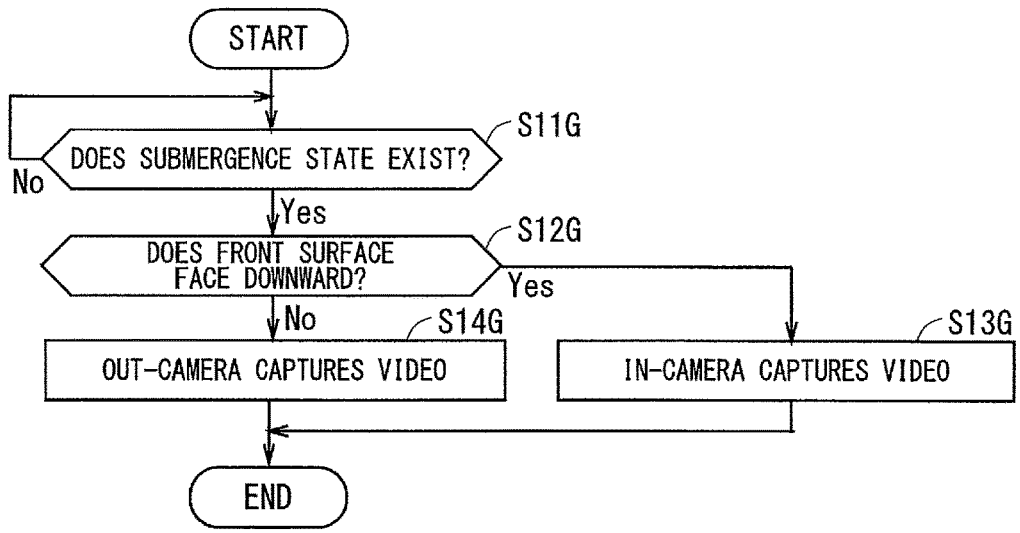
FIG. 38 illustrates a flowchart showing an example of a series of control actions.

In Step S11G of FIG. 38, the controller 100 determines whether the submergence state exists as in Step S11A (see FIG. 16). The controller 100 repetitively makes determination in Step S11G until the submergence state is detected. If the submergence state is detected, Step S12G may be performed.

In Step S12G, the controller 100 determines whether the front surface 1a faces downward as in Step S13A (see FIG. 16). If the front surface 1a faces downward, Step S13G may be performed. If the front surface 1a does not face downward, Step S14G may be performed.

In Step S13G, the camera controller 112A causes the in-camera 190 to capture a video. When the submergence state is detected by the submergence detector 201 and the face-down orientation state is detected by the orientation detector 231, the camera controller 112A causes the in-camera 190 to capture a video. In a case where the in-camera 190 has been capturing a video, the video shooting through the use of the in-camera 190 may be continued. In a case where the in-camera 190 has not been capturing a video, the video shooting through the use of the in-camera 190 is started. In a case where the out-camera 180 or another camera has been capturing a video, the video shooting through the use of the in-camera 190 is started in place of the ongoing video shooting.

The video captured by the in-camera 190 may be transmitted to the calling party device and displayed on the display screen 2a or may be stored in the storage 103, various memories, and the like. The video captured by the in-camera 190 may be transmitted to the calling party device without being displayed on the display screen 2a. The display screen 2a may be placed in the non-display state in which no information is output. Examples of the various memories may include a memory of a server or may include one or more memories in a cloud computing environment.

In Step S14G, the camera controller 112A causes the out-camera 180 to capture a video. In a case where the out-camera 180 has been capturing a video, the video shooting through the use of the out-camera 180 is continued. In the case where the out-camera 180 has not been capturing a video, the video shooting through the use of the out-camera 180 is started. In a case where the in-camera 190 or another camera has been capturing a video, the video shooting through the use of the out-camera 180 is started in place of the ongoing video shooting.

When either Step S13G or Step S14G is finished, these actions are completed. When the submergence state ceases after Step S13G or Step S14G, these actions may be started from the beginning.

This configuration enables easy switching among the cameras for video shooting according to the orientation of the front surface 1a.

2-8. Eighth Modification

When the submergence state is detected, the input/output controller 113 may place the display screen 2a in the non-display state. Specifically, when the submergence state is detected by the submergence detector 201 in the state (hereinafter also referred to as a "display state") in which information is displayed on the display screen 2a, the input/output controller 113 may place the display screen 2a in the non-display state in which no information is displayed. Considering the fact that the touch panel 130 of the electronic apparatus in the submergence state cannot easily detect the user's operation and that no information displayed on the display screen 2a is easily visible to the user in this state after all, such a modification may be employed to reduce power consumption.

Figure 39:
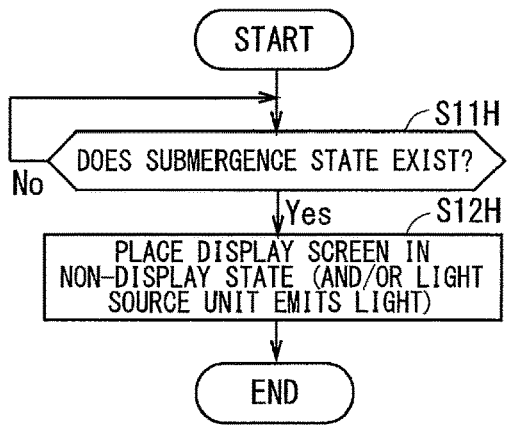
FIG. 39 illustrates a flowchart showing an example of a series of control actions.

More specifically, a series of actions in FIG. 39 for controlling the electronic apparatus may be performed. These control actions can be implemented based on the execution, by the controller 100, of the control program stored in the storage 103.

In Step S11H of FIG. 39, the controller 100 determines whether the submergence state exists as in Step S11A (see FIG. 16). The controller 100 may repetitively make determination in Step S11H until the submergence state is detected. If the submergence is detected, Step S12H may be performed. In Step S12H, the input/output controller 113 places the display screen 2a in the non-display state. When Step S12H is finished, these actions are completed.

When the submergence state is detected, the lighting controller 115 may cause the light source unit 240 to emit light. The light source unit 240 may continuously emit light, intermittently emit light, flash on and off, or instantaneously emit light. The emission of light caused by the light source unit 240 should coincide with, for example, shooting through the use of the camera. When the submergence state is detected, shooting through the use of the out-camera 180, the in-camera 190, or the external camera unit 610o may be started. Additionally, this configuration can easily cover the lack of brightness for shooting in water.

2-9. Ninth Modification

When a specific state is detected, the electronic apparatus may merely perform a specific action corresponding to the specific state. In a ninth modification, the specific state may be the proximity state and the specific action may be a specific action in which the input/output controller 113 places the display screen 2a in the non-display state. In this case, a series of actions in FIG. 40 for controlling the electronic apparatus may be performed. The control actions can be implemented based on the execution, by the controller 100, of the control program stored in the storage 103.

Figure 40:
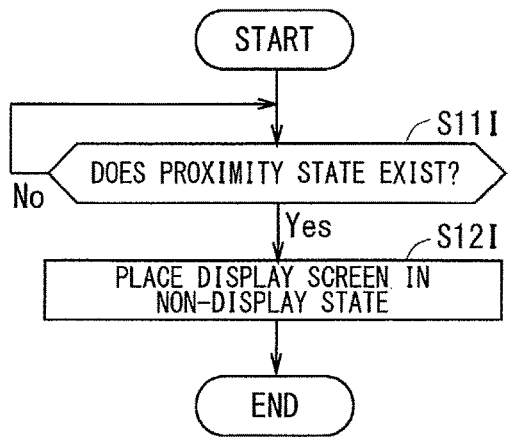
FIG. 40 illustrates a flowchart showing an example of a series of control actions.

In Step S11I of FIG. 40, determination in Step S11I is repetitively made until the proximity state is detected by the proximity detector 211. If the proximity state is detected, Step S12I may be performed. In Step S12I, the input/output controller 113 places the display screen 2a in the non-display state. When the electronic apparatus is in the proximity state, the display screen 2a is not easily visible to the user after all. Thus, the display screen 2a may be placed in the non-display state so as to reduce power consumption. Alternatively, the display screen 2a may be placed in the non-display state when the user covers, with a finger, the part occupied by the proximity sensor of the electronic apparatus.

The actions in Steps S11I and S12I in FIG. 40 may be performed when a video call is started.

In a case where the specific state is the high-speed movement state and the volume of a sound input to the microphone 150 or the like is smaller than or equal to a predetermined threshold, the specific action may be a specific action in which the input/output controller 113 places the electronic apparatus in the state in which the audio input/output is disabled. When the electronic apparatus is moving at a high speed, most of the noises caused by, for example, cutting through the breeze are not transmitted to the calling party.

2-10. Tenth Modification

When two or more specific states are detected, specific actions corresponding to these specific states may be performed. These specific states may include both the submergence state and the state (hereinafter also referred to as an "unconnected state") in which the external device is not communicably connected to the electronic apparatus. The specific actions may refer to disabling the audio input/output and displaying a screen (hereinafter also referred to as an "mute screen") indicating that the audio input/output is disabled. In this case, a series of control actions in FIG. 41 for controlling the electronic apparatus 1E may be performed. These control actions can be implemented based on the execution, by the controller 100, of the control program stored in the storage 103.

Figure 41:
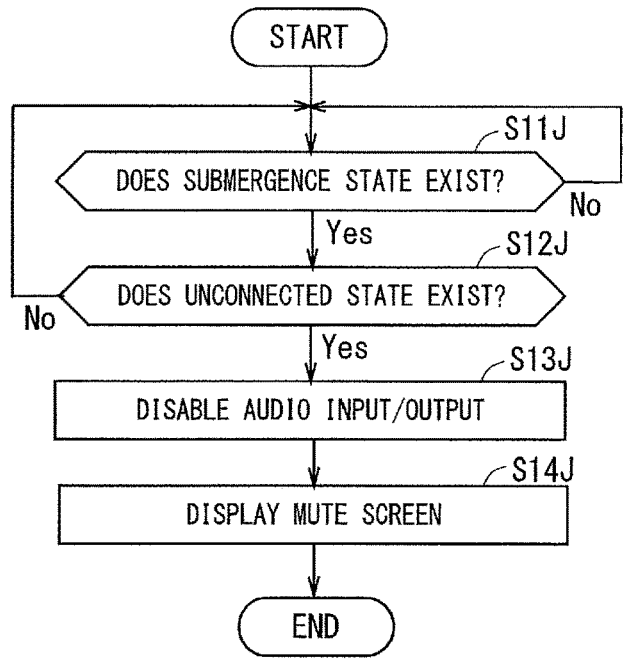
FIG. 41 illustrates a flowchart showing an example of a series of control actions.
Figure 42:
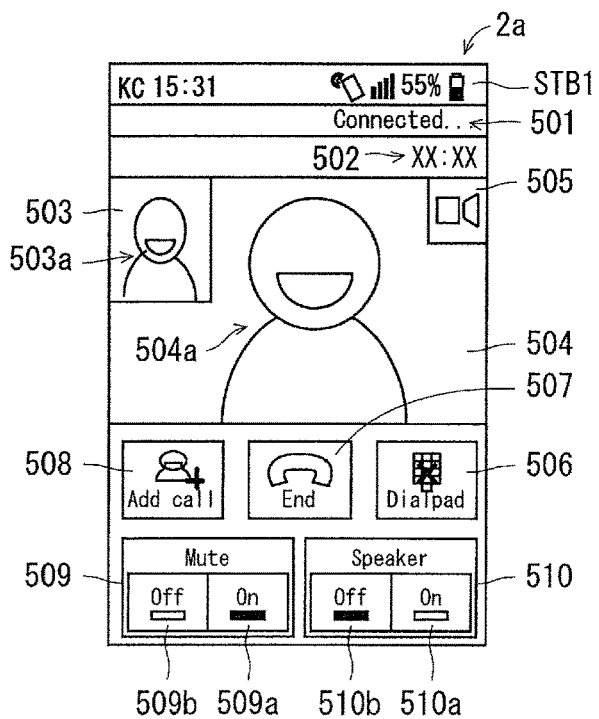
FIG. 42 illustrates example display contents of the display screen associated with a video call.

In Step S11J of FIG. 41, the controller 100 determines whether the submergence state exists as in, for example, Step S11A (see FIG. 16). The controller 100 may repetitively make determination in Step S11J until the submergence state is detected. If the submergence state is detected, Step S12J is performed. In Step S12J, the controller 100 determines whether the unconnected state exists. If no such unconnected state exists, Step S11J may be performed again. If the unconnected state exists, Step S13J may be performed. The unconnected state may be recognized by the connection recognition unit 114f. In Step S13J, the input/output controller 113 disables the audio input and output to and from the electronic apparatus 1E. That is to say, the mute function is enabled. This can minimize the mixing of noises into a sound to be transmitted to the calling party device and reduce power consumption. In Step S14J, the controller 100 displays the mute screen on the display screen 2a. Thus, the user can readily recognize that the mute function is enabled. When Step S14J is finished, these actions are completed The mute screen may be similar to the voice call screen and the video call screen, and further includes an element indicating that the audio input/output is disabled. An example of the mute screen is as shown in FIG. 42. An audio input/output blocking screen illustrated in FIG. 42 may be similar to the video call screen illustrated in FIG. 8, whereas the audio input/output blocking screen may show the state in which the on button 509a for enabling the mute function and the off button 510b for disabling the speakerphone function are turned on.

2-11. Eleventh Modification

The audio input/output route passing though the microphone unit 610m and the sound output unit 610s of the external device 610 may remain available when and after the submergence state ceases. Specifically, a series of actions in FIG. 43 may be performed in place of the series of actions in FIG. 33. These control actions can be implemented based on the execution, by the controller 100, of the control program stored in the storage 103.

Figure 43:
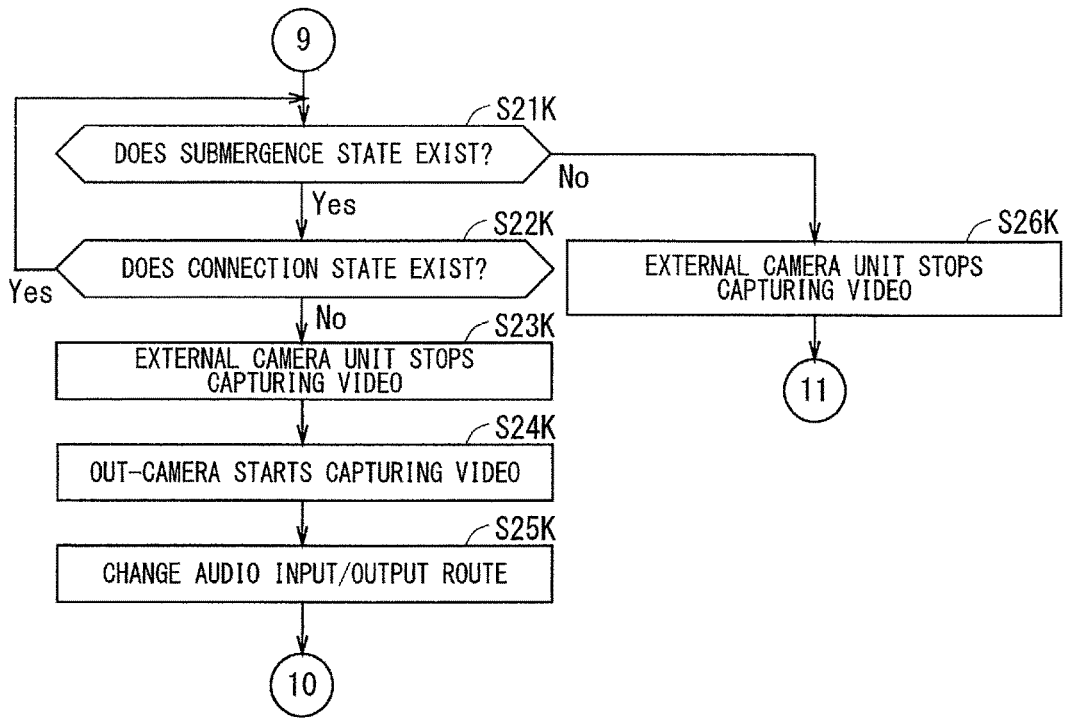
FIG. 43 illustrates a flowchart showing an example of a series of control actions.
Figure 44:
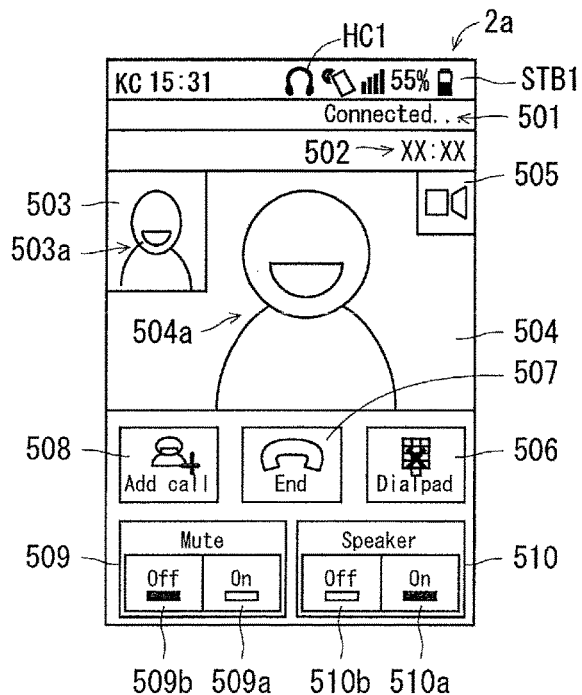
FIG. 44 illustrates example display contents of the display screen associated with a video call.

A series of actions in Steps S21K to S26K of FIG. 43 eliminate the processing of Step S27E included in a series of actions in Steps S21E to S27 of FIG. 33. Thus, Step S27E, in which the audio input/output route is changed, is not performed when the submergence state ceases. The audio input/output route passing through the microphone unit 610m and the sound output unit 610s of the external device 610 may remain available when and after the submergence state ceases. The user can accordingly perform a voice call smoothly through the ongoing use of the same audio input/output route. After the processing of Step S26K, the in-camera 190 starts capturing a video in Step S41E of FIG. 35, so that the electronic apparatus is placed in the state which is similar to the original video call state. As illustrated in FIG. 44, the icon HC1 indicative of the connection state may be additionally displayed on the status bar STB1. The user can readily recognize that the audio input/output through the external device 610 remains available.

2-12. Twelfth Modification

When each of the specific states other than the submergence state is detected, the corresponding one of processes may be performed, regardless of whether the submergence state is detected. Examples of these specific states include the proximity state in which an object is in close proximity to the front surface 1a, the low luminance state in which the brightness of a captured image is not high, the high-speed movement state in which the electronic apparatus 1 is moving at a high speed, and the state in which the electronic apparatus 1 is in a specific orientation. A series of actions taken to control the electronic apparatus may be performed as illustrated in FIG. 45. These control actions can be implemented based on the execution, by the controller 100, of the control program stored in the storage 103.

The actions in Steps S31L to S35L of FIG. 45 are similar to the actions in Step S31A to S35A of FIG. 17, whereas the processing of Step S31L of FIG. 45 may be performed whatever the preceding state of the electronic apparatus may be. For example, the camera controller 112A can cause the out-camera 180, instead of the in-camera 190, to start capturing a video in any of the instances where: the proximity state is detected by the proximity detector 211 in Step S31L; the low luminance state is recognized by the third state recognition unit 114c in Step S32L; and the high-speed movement state is detected by the motion detector 221 in Step S33L. When the processing of Step S35L of FIG. 45 is finished, these actions are completed.

2-13. Thirteenth Modification

A plurality of parts that are, directly or indirectly, attached to one another may integrally constitute the apparatus case 3. The following will describe an electronic apparatus 1M, which is a concrete example of the above configuration.

Figure 46:
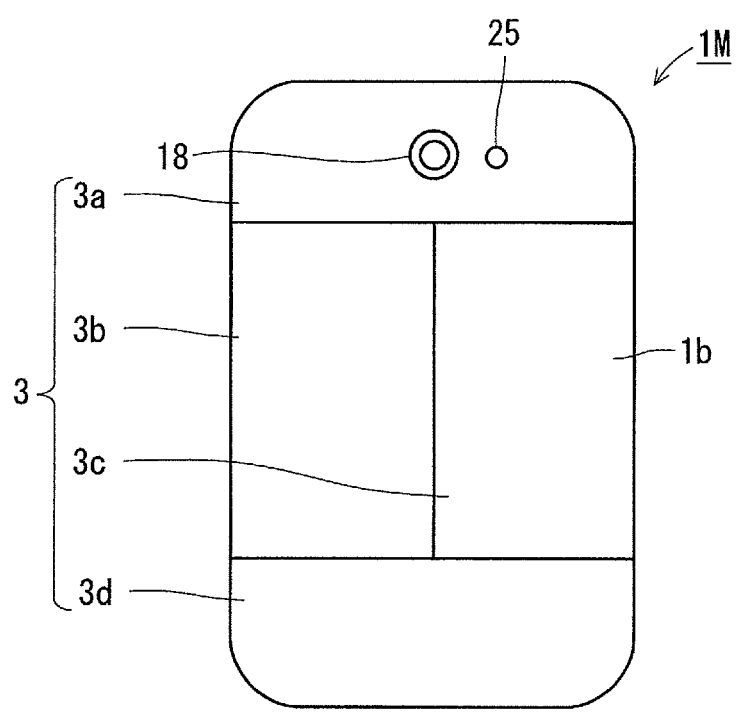
FIG. 46 illustrates a schematic rear view of an example of the external appearance of the electronic apparatus.

FIG. 46 illustrates a schematic rear view of an example of an external appearance of the electronic apparatus 1M according to a thirteenth modification. The electronic apparatus 1M is, for example, a "waterproof" mobile phone such as a "waterproof" smartphone. In the electronic apparatus 1M, modules 3a to 3d attached to the cover panel 2 mainly constitute the apparatus case 3. The module 3a is, for example, a camera unit with the out-camera 180 and the in-camera 190 embedded therein. The module 3b is, for example, a control unit with the controller 100 embedded therein for controlling the electronic apparatus 1M. The module 3c is, for example, a power supply unit with the battery 250 embedded therein for supplying power to the electronic apparatus 1M. The module 3d is, for example, a unit with an appropriate component embedded therein.

In this configuration, the module 3b, namely, the control unit of the electronic apparatus 1M includes the storage 103 that can store programs and the camera controllers 112, 112A, and 112E that can be implemented based on the execution of the programs by processors such as a CPU and a DSP. Each of the camera controllers 112, 112A, and 112E can control the processing in which the out-camera 180 starts capturing a video when the submergence state in which the apparatus case 3 of the corresponding one of the electronic apparatuses 1, 1A, and 1E is located underwater is detected by the submergence detector 201.

The camera controller 112E can control the processing in which the external camera unit 610o starts capturing a video when the connection state in which the external device 610 including the external camera unit 610o is communicably connected to the electronic apparatus 1M is recognized and the submergence state is detected.

While the electronic apparatuses 1, 1A, 1E, and 1M, the method for controlling the electronic apparatuses, the control unit of the electronic apparatuses, the electronic apparatus system 600, and the control programs Pg1 to Pg3 have been described above in detail, the foregoing description is in all aspects illustrative and not restrictive. The various modifications described above are applicable in combination as long as they are consistent with each other. It is understood that numerous modifications which have not been exemplified can be devised without departing from the scope of the present disclosure.

What is claimed is:

1. An electronic apparatus comprising:
    a display screen:
    a back camera located in a back surface opposite to a front surface on which the display-screen is located;
    a submergence sensor configured to measure a first physical quantity that varies when the electronic apparatus is submerged in water;
    at least one processor configured to detect, based on the first physical quantity measured by the submergence sensor, a submergence state in which the back camera is located underwater, wherein in response to detecting the submergence state, the at least one processor automatically causes the back camera to start capturing a video;
    a front camera located in the front surface, wherein in response to detecting the submergence state, the at least one processor causes the front camera to stop capturing a video and causes the back camera to start capturing a video; and
    a motion sensor configured to measure a second physical quantity that varies according to a movement of the electronic apparatus, wherein in response to detecting, based on the second physical quantity measured by the motion sensor, a high-speed movement state in which the electronic apparatus is moving at a speed greater than or equal to a predetermined reference speed, the at least one processor causes the back camera to start capturing a video.

2. The electronic apparatus according to claim 1,
    wherein in response to detecting the submergence state during a voice call between the electronic apparatus and an external communication apparatus, the at least one processor causes the back camera to start capturing a video.

3. The electronic apparatus according to claim 1, wherein in a case where a video call between the electronic apparatus and the external communication apparatus is performed and an image captured by the front camera is transmitted from the electronic apparatus to the external communication apparatus during the video call, in response to the at least one processor detecting the submergence state, the at least one processor causes the back camera to start capturing a video, and the at least one processor starts transmitting the image captured by the back camera to the external communication apparatus.

4. The electronic apparatus according to claim 3,
    wherein in response to detecting ceasing of the submergence state, the at least one processor causes the front camera, in place of the back camera, to capture a video.

5. The electronic apparatus according to claim 1, wherein the at least one processor obtains an evaluation value associated with a brightness of an image captured by the front camera, and
    in response to the evaluation value being smaller than or equal to a reference value, the at least one processor causes the back camera to start capturing a video.

6. The electronic apparatus according to claim 1, further comprising an angle sensor configured to measure a physical quantity that varies according to an orientation of the front surface,
    wherein in response to detecting the submergence state and concurrently detecting, based on the physical quantity measured by the angle sensor, a face-down orientation state in which the front surface faces downward, the at least one processor causes the front camera to capture a video.

7. The electronic apparatus according to claim 1,
    wherein in a case where the display screen is in a display state in Which information is displayed on the display screen, in response to the at least one processor detecting the submergence state, the at least one processor places the display screen in a non-display state in which no information is displayed on the display screen.

8. The electronic apparatus according to claim 1, further comprising a proximity sensor configured to measure a physical quantity that varies according to a proximity of an object to the front surface,
    wherein in response to detecting, based on the physical quantity measured by the proximity sensor, a proximity state in which the object is in close proximity to the front surface, the at least one processor causes the back camera to start capturing a video.

9. The electronic apparatus according to claim 1,
    wherein in response to detecting the submergence state and recognizing a connection state in which an external device including a camera unit is communicably connected to the electronic apparatus, the at least one processor causes the camera unit to start capturing a video.

10. A non-transitory computer readable recording medium storing a control program for controlling an electronic apparatus having a front camera and a back camera located on an opposite side of the electronic apparatus with respect to the front camera, the control program causing the electronic apparatus to execute:
    measuring a first physical quantity that varies during a time when the electronic apparatus is submerged in water and detecting a submergence state in which a back camera is located underwater;
    in response to the submergence state being detected automatically causing the front camera to stop capturing a video and causing the back camera to start capturing a video;
    measuring a second physical quantity that varies according to a movement of the electronic apparatus; and
    in response to detecting, based on the measured second physical quantity, a high-speed movement state in which the electronic apparatus is moving at a speed greater than or equal to a predetermined reference speed, causing the back camera to start capturing a video.

11. An electronic apparatus system comprising:
the electronic apparatus according to claim 9; and
the external device communicably connected to the electronic apparatus.

12. The electronic apparatus of claim 1, wherein the at least one processor is further configured to automatically cause a camera unit of the electronic apparatus to start capturing a video in response to detecting the submergence state but no wireless connection state between the electronic apparatus and an external device.

* * * * *